United States Patent

Kajiwara

[11] Patent Number: 5,841,518
[45] Date of Patent: Nov. 24, 1998

[54] IMAGE IDENTIFICATION APPARATUS AND IMAGE IDENTIFICATION METHOD

[75] Inventor: Kazuhiko Kajiwara, Kanagawa, Japan

[73] Assignee: Fuji Photo Film Co., Ltd., Kanagawa, Japan

[21] Appl. No.: 639,898

[22] Filed: Apr. 26, 1996

[30] Foreign Application Priority Data

| Apr. 28, 1995 | [JP] | Japan | 7-106738 |
| Apr. 28, 1995 | [JP] | Japan | 7-106739 |
| Apr. 28, 1995 | [JP] | Japan | 7-106740 |

[51] Int. Cl.$^6$ .............................. G03B 27/52; G03B 27/80
[52] U.S. Cl. ................................. 355/40; 35/38
[58] Field of Search .................. 355/38, 39, 40; G03B 27/80, 27/32, 27/52, 27/46, 27/72

[56] References Cited

U.S. PATENT DOCUMENTS

| 5,210,570 | 5/1993 | Minamisawa et al. | 355/38 O |
| 5,555,181 | 9/1996 | Seto | 355/41 O |
| 5,561,494 | 10/1996 | Terashita | 355/38 O |
| 5,671,041 | 9/1997 | Iwaki | 355/38 O |
| 5,734,463 | 3/1998 | Yoshikawa | 355/40 O |

FOREIGN PATENT DOCUMENTS

| 4-303833 | 10/1992 | Japan | G03B 27/72 |
| 4-350643 | 12/1992 | Japan | G03B 27/46 |
| 5-323464 | 12/1993 | Japan | G03B 27/46 |

Primary Examiner—Arthur T. Grimley
Assistant Examiner—Shival Virmani
Attorney, Agent, or Firm—Sughrue, Mion, Zinn, Macpeak & Seas, PLLC

[57] ABSTRACT

An image size identification apparatus and an image size identification method capable of identifying the size of an image recorded on a photographic film at a high accuracy are disclosed.

Densities at a plurality of measurement points in a density measurement area including an image recording range on a photographic film on which an image is recorded are measured. On the basis of the measured densities, image characteristics which reflect an image size are extracted to determine the image size. An image portion is estimated on the basis of a measurement area, and a distribution of the estimated image in the measurement area can be used as the image characteristics which reflect the image size. The degree of dispersion of densities or density change amounts in a predetermined determination area in the measurement area can be used as the image characteristics which reflect an image size. When one or both of these characteristics are used, an image size can be identified at an accuracy higher than that of prior art.

20 Claims, 27 Drawing Sheets

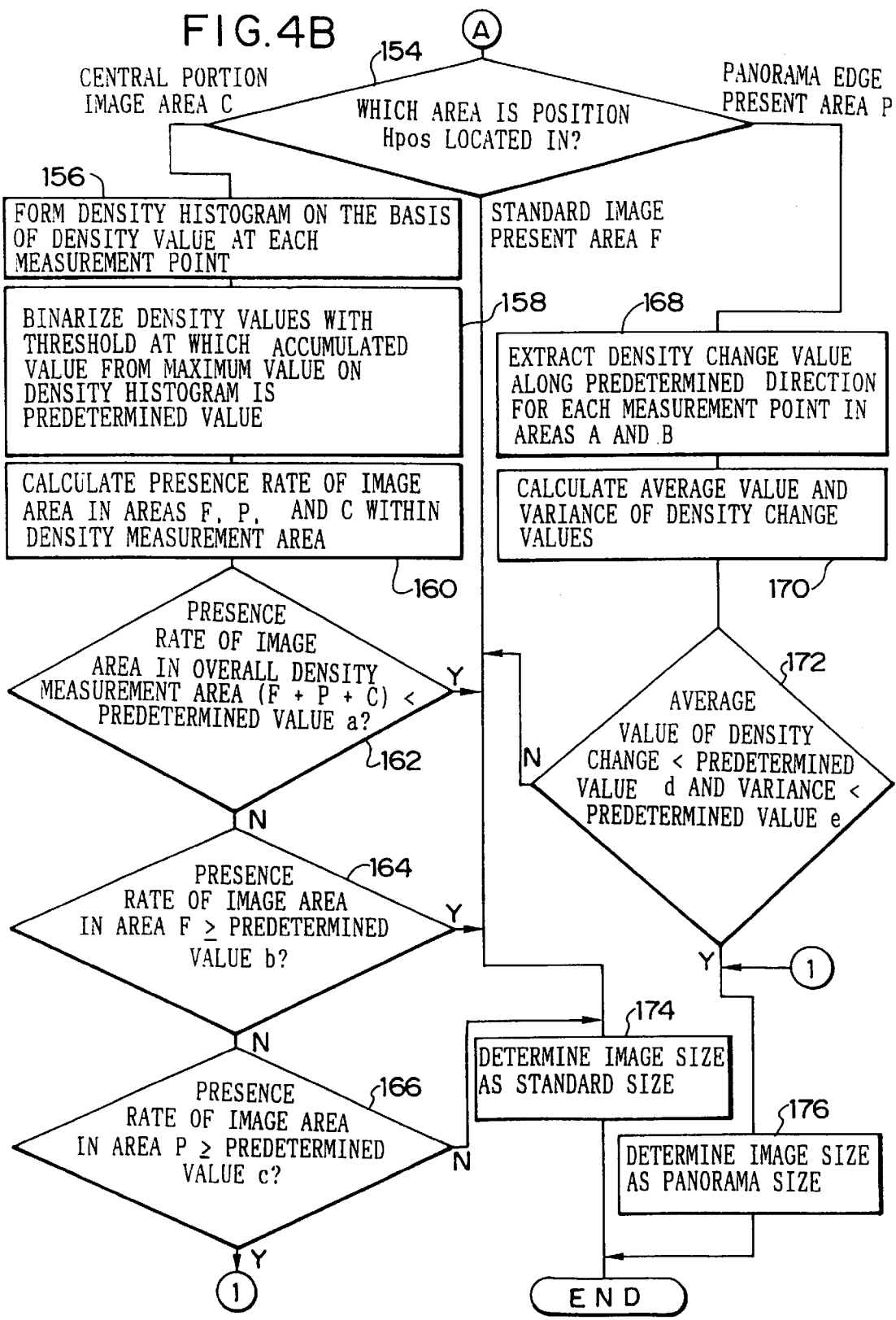

| 1 | 1 | 1 |
|---|---|---|
| 1 | -2 | -1 |
| 1 | -1 | -1 |

| 1 | 1 | 1 |
|---|---|---|
| 1 | -2 | 1 |
| -1 | -1 | -1 |

| 1 | 1 | 1 |
|---|---|---|
| -1 | -2 | 1 |
| -1 | -1 | 1 |

| 1 | 1 | -1 |
|---|---|---|
| 1 | -2 | -1 |
| 1 | 1 | -1 |

| -1 | 1 | 1 |
|---|---|---|
| -1 | -2 | 1 |
| -1 | 1 | 1 |

| 1 | -1 | -1 |
|---|---|---|
| 1 | -2 | -1 |
| 1 | 1 | 1 |

| -1 | -1 | -1 |
|---|---|---|
| 1 | -2 | 1 |
| 1 | 1 | 1 |

| -1 | -1 | 1 |
|---|---|---|
| -1 | -2 | 1 |
| 1 | 1 | 1 |

FIG. 6A
STANDARD SIZE IMAGE RECORDED ON NEGATIVE FILM

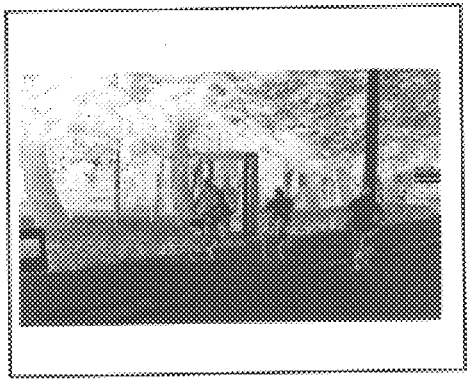

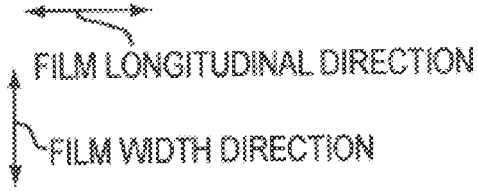
FILM LONGITUDINAL DIRECTION
FILM WIDTH DIRECTION

FIG. 6B
IMAGE REPRESENTING DENSITY CHANGE VALUE

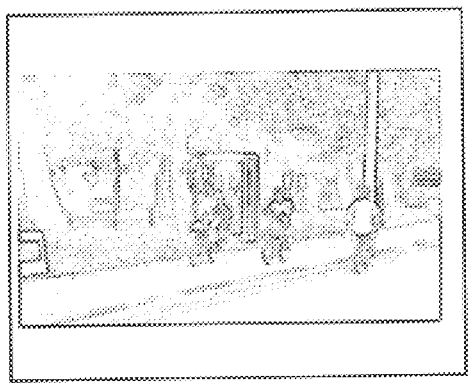

FIG. 6C
ACCUMULATED VALUE OF DENSITY CHANGE IN FILM WIDTH DIRECTION FOR MEASUREMENT POINT STRINGS ARRANGED ALONG FILM LONGITUDINAL DIRECTION

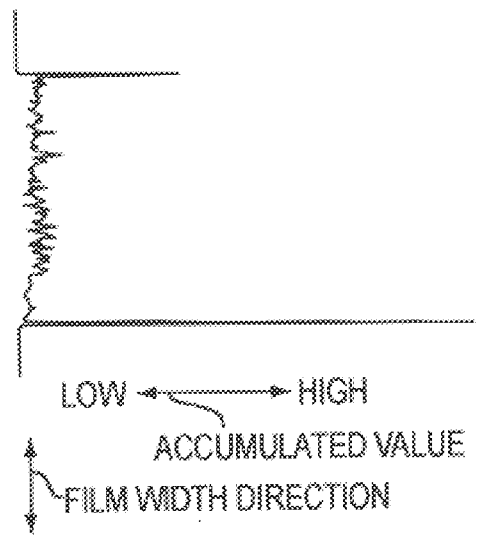

LOW ← → HIGH
ACCUMULATED VALUE
FILM WIDTH DIRECTION

FIG. 6D
ACCUMULATED VALUE OF DENSITY CHANGE IN FILM LONGITUDINAL DIRECTION FOR MEASUREMENT POINT STRINGS ARRANGED ALONG FILM WIDTH DIRECTION

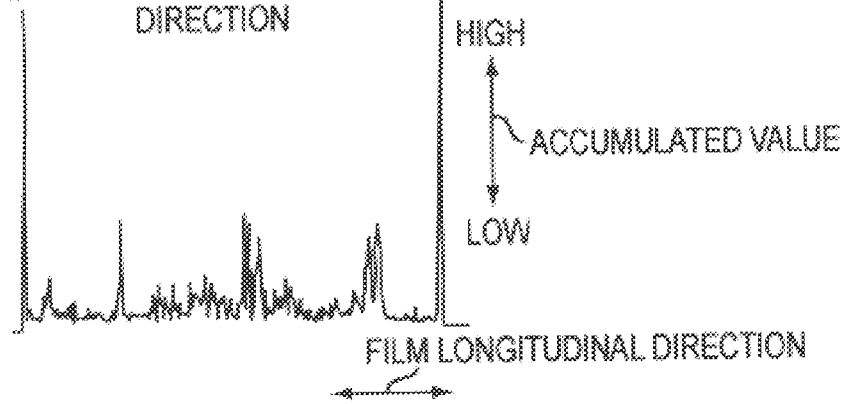

HIGH
ACCUMULATED VALUE
LOW
FILM LONGITUDINAL DIRECTION

FIG. 7A
PANORAMA SIZE IMAGE RECORDED ON NEGATIVE FILM

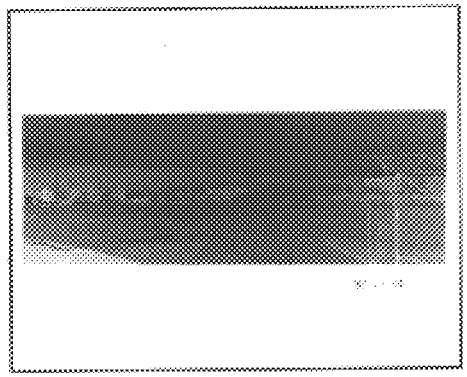

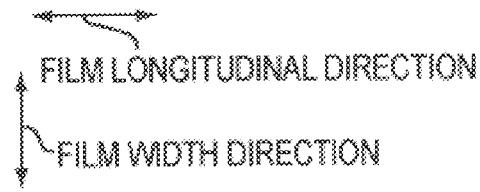
FILM LONGITUDINAL DIRECTION
FILM WIDTH DIRECTION

FIG. 7B
IMAGE REPRESENTING DENSITY CHANGE VALUE

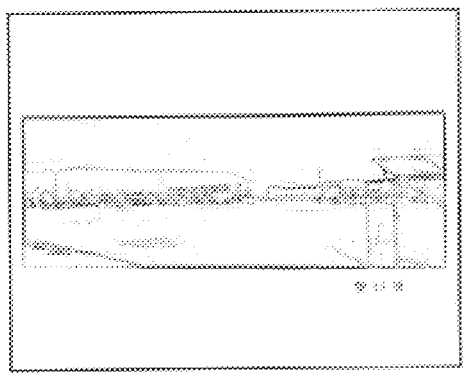

FIG. 7C
ACCUMULATED VALUE OF DENSITY CHANGE IN FILM WIDTH DIRECTION FOR MEASUREMENT POINT STRINGS ARRANGED ALONG FILM LONGITUDINAL DIRECTION

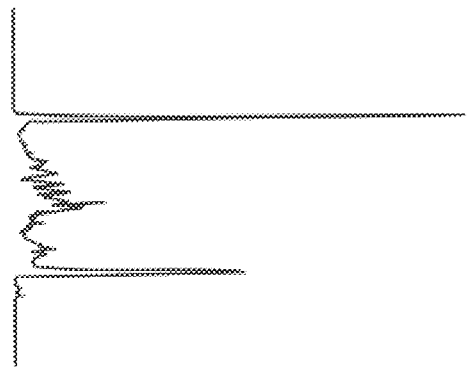

LOW ← → HIGH
ACCUMULATED VALUE
FILM WIDTH DIRECTION

FIG. 7D
ACCUMULATED VALUE OF DENSITY CHANGE IN FILM LONGITUDINAL DIRECTION FOR MEASUREMENT POINT STRINGS ARRANGED ALONG FILM WIDTH DIRECTION

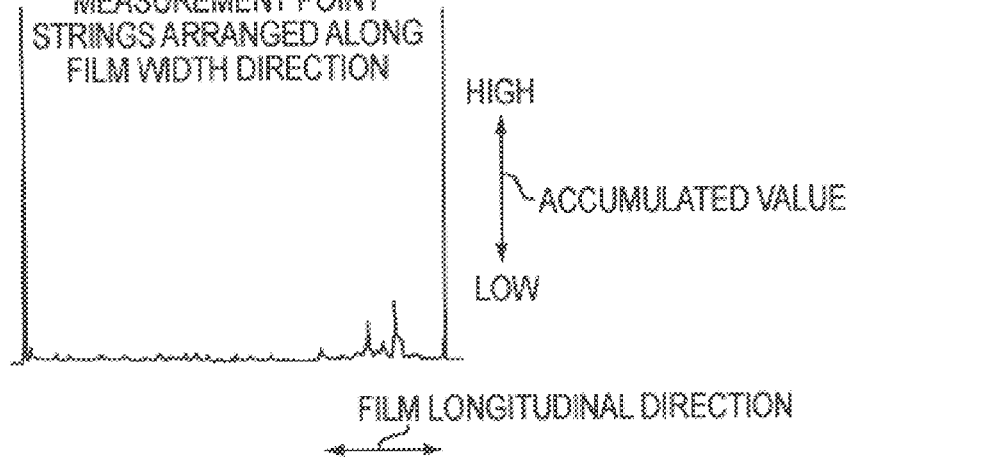

HIGH
ACCUMULATED VALUE
LOW

FILM LONGITUDINAL DIRECTION

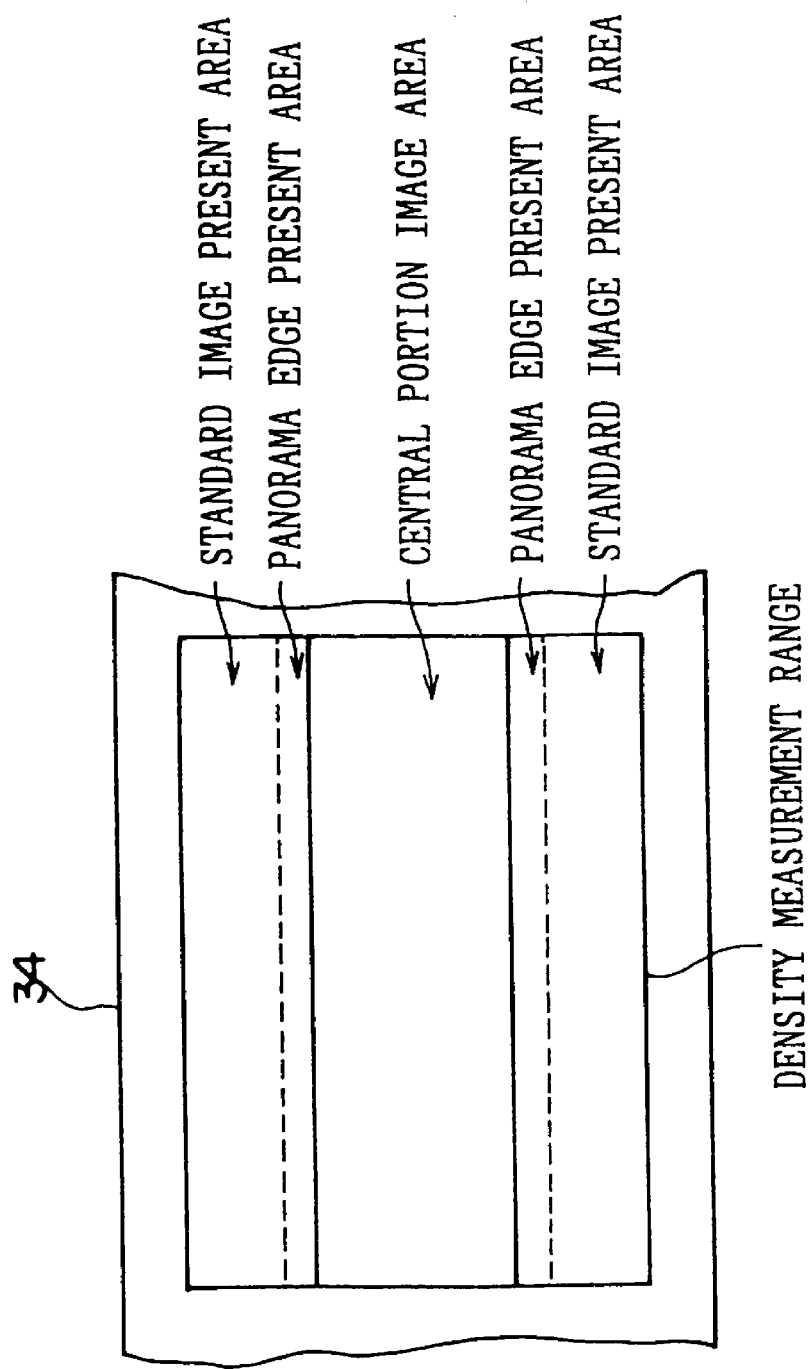

FIG. 9A
STANDARD SIZE IMAGE OF FIREWORK SCENE RECORDED ON NEGATIVE FILM

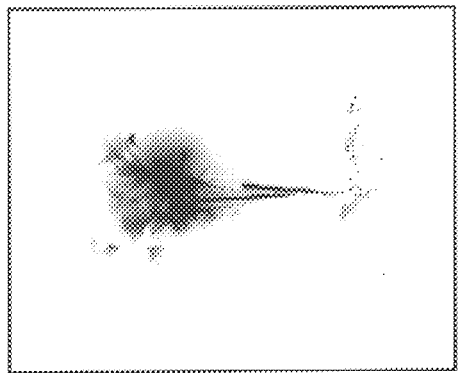

← FILM LONGITUDINAL DIRECTION
↕ FILM WIDTH DIRECTION

FIG. 9B
IMAGE REPRESENTING DENSITY CHANGE VALUE

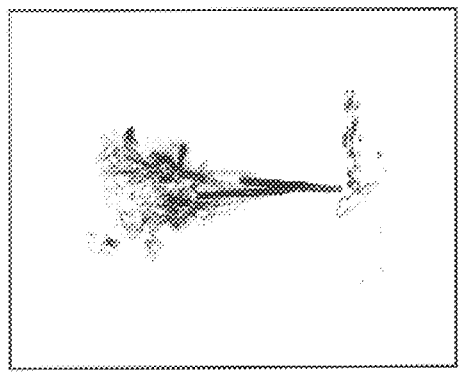

FIG. 9C
ACCUMULATED VALUE OF DENSITY CHANGE IN FILM WIDTH DIRECTION FOR MEASUREMENT POINT STRINGS ARRANGED ALONG FILM LONGITUDINAL DIRECTION

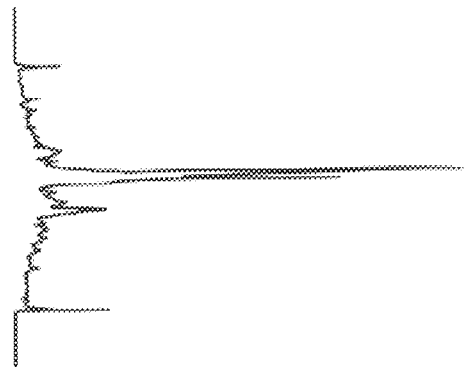

LOW ← → HIGH
ACCUMULATED VALUE
↕ FILM WIDTH DIRECTION

FIG. 9D
ACCUMULATED VALUE OF DENSITY CHANGE IN FILM LONGITUDINAL DIRECTION FOR MEASUREMENT POINT STRINGS ARRANGED ALONG FILM WIDTH DIRECTION

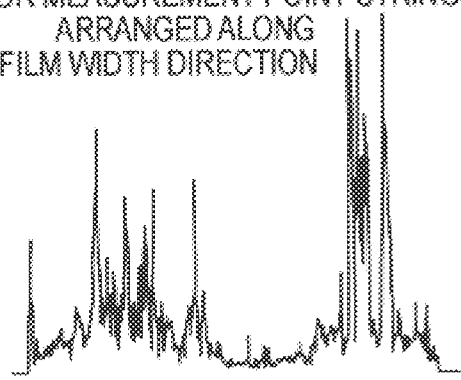

HIGH
↕ ACCUMULATED VALUE
LOW

FILM LONGITUDINAL DIRECTION

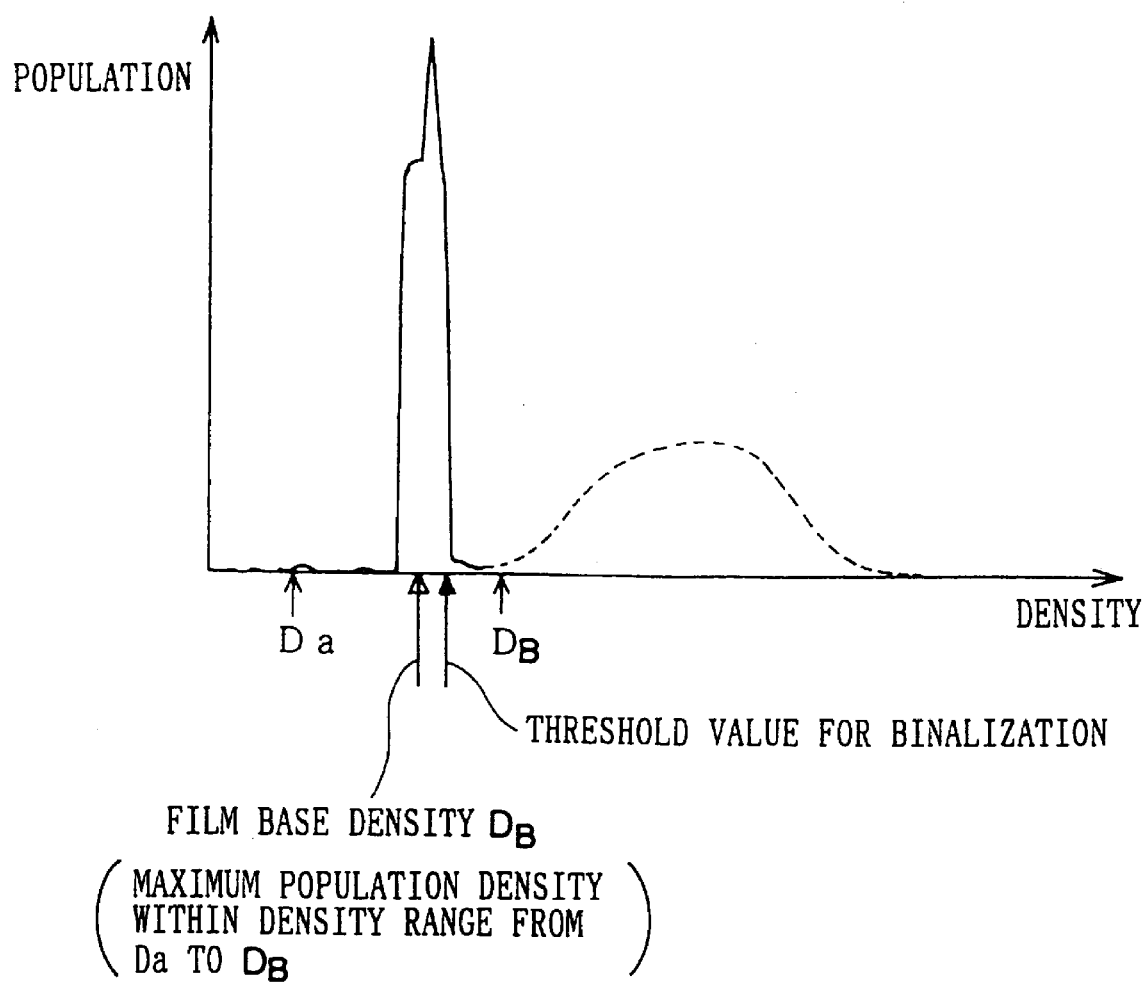

PANORAMA SIZE IMAGE RECORDED ON NEGATIVE FILM

BINALIZED IMAGE

BINALIZATION

STANDARD SIZE IMAGE RECORDED ON NEGATIVE FILM

BINALIZED IMAGE

BINALIZATION

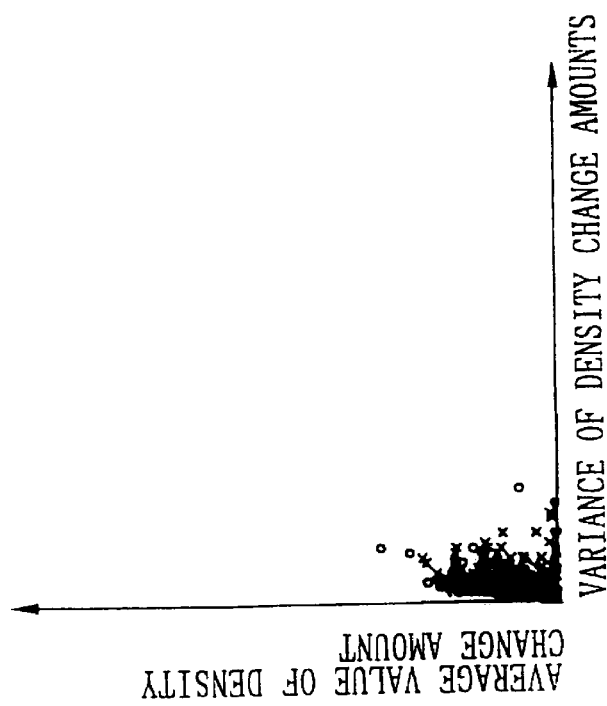
FIG.13B MEASUREMENT AND CALCULATION RESULT OF AVERAGE VALUE AND VARIANCE OF DENSITY CHANGE AMOUNT IN AREA A AND B FOR STANDARD SIZE IMAGE
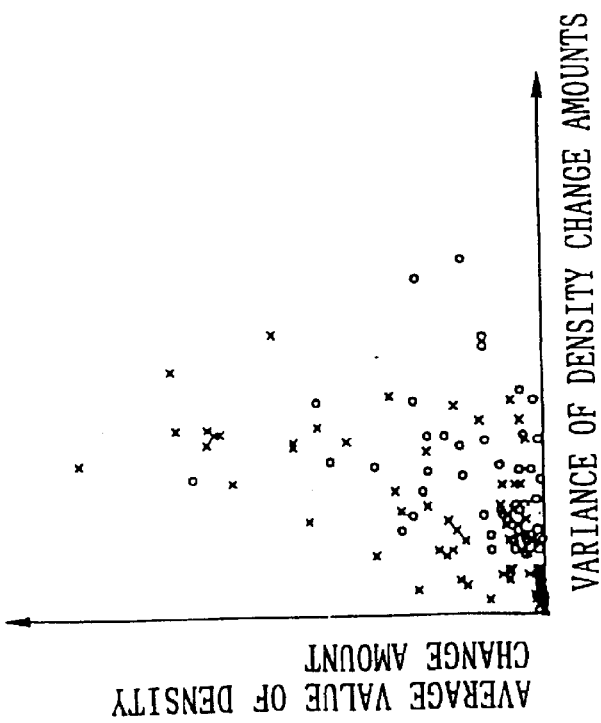
FIG.13A MEASUREMENT AND CALCULATION RESULT OF AVERAGE VALUE AND VARIANCE OF DENSITY CHANGE AMOUNT IN AREA A AND B FOR STANDARD SIZE IMAGE

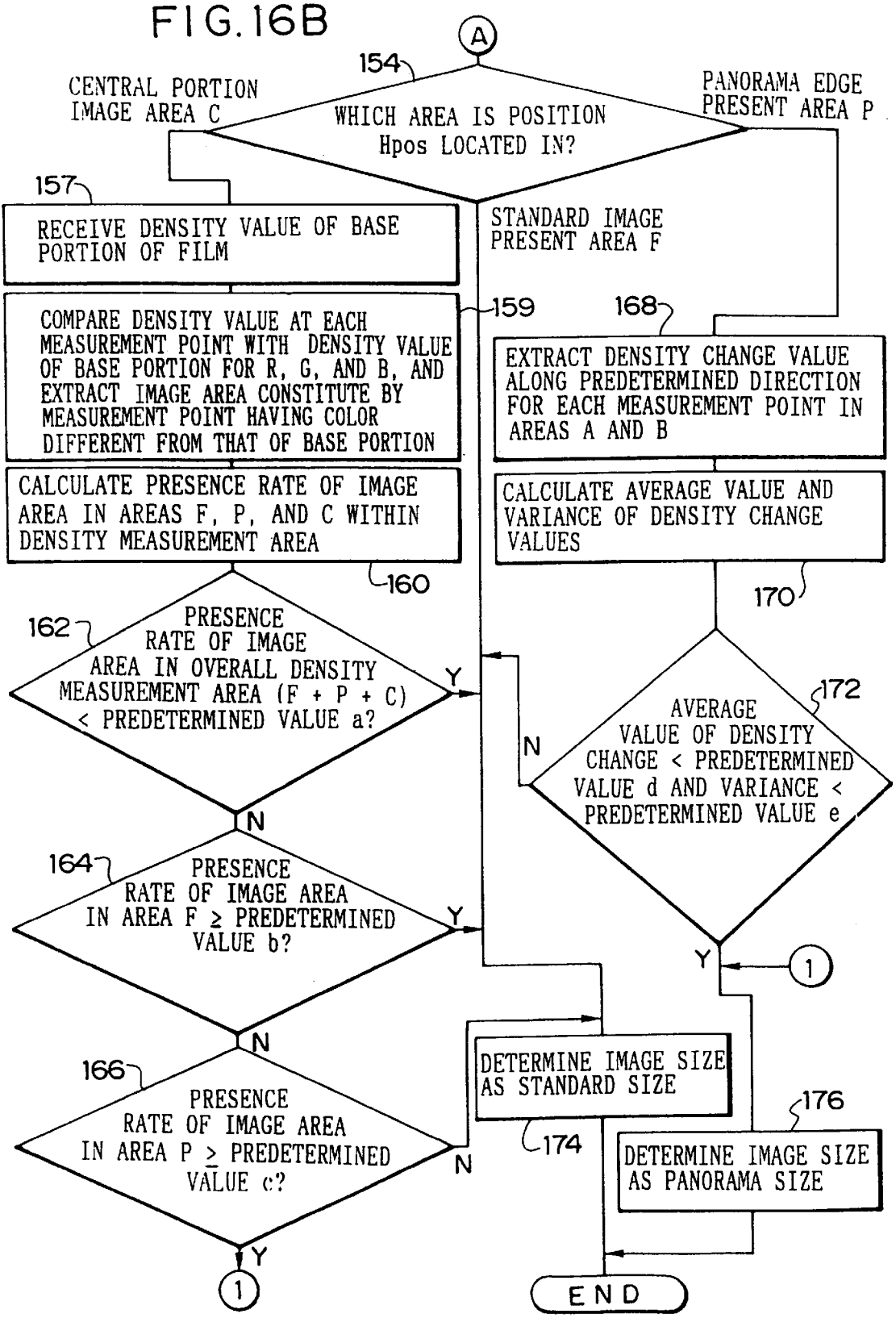

STANDARD SIZE IMAGE OF FIREWORK
SCENE RECORDED ON NEGATIVE FILM

DENSITY HISTOGRAM

ACCUMULATED POPULATION HISTOGRAM

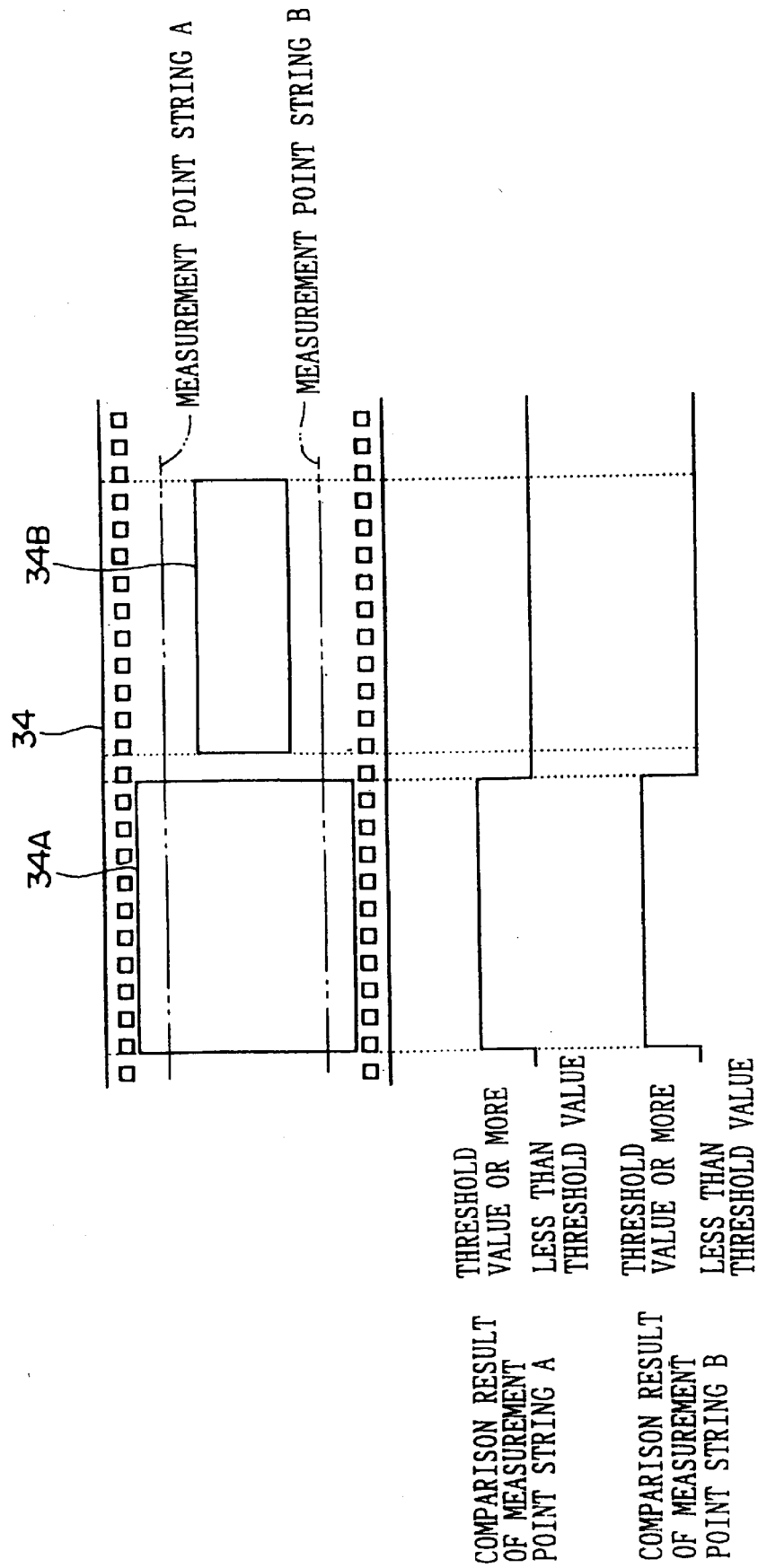

POSITION OF MEASUREMENT POINT STRINGS USED IN CALCULATION OF CHARACTERISTIC VALUE

HISTOGRAM OF CHARACTERISTIC F

ACCUMULATED POPULATION HISTOGRAM OF CHARACTERISTIC VALUE F ns and an image identification method.

IMAGE IDENTIFICATION APPARATUS AND IMAGE IDENTIFICATION METHOD

BACKGROUND OF THE INVENTION

1. Field of the Invention

The present invention relates to an image size identification method and an image size identification apparatus and, more particularly, to an image size identification method for detecting the size of an image recorded on a photographic film and an image size identification apparatus to which the image size identification method is applied.

2. Description of the Related Art

In recent years, a camera capable of recording different frame size images (e.g., a standard-size, a panorama-size, or the like) in one photographic film has been popularly circulated. In a photographic processing step of performing various processes to a photographic film such as a negative film, processing contents must be changed depending on the frame size of an image recorded on the photographic film. For example, in a photograph printing step of printing an image recorded on a negative film to a printing paper, switching a masking range, a change in printing magnification, a change in size of a printing paper, and the like must be performed depending on the image size. For this reason, in order to automatically perform a processing step such as a photograph printing step to a photographic film on which different frame size images are recorded, the size of each image recorded on the photographic film must be detected. Conventionally, various detection methods are proposed.

As an example, Japanese Patent Application Laid-Open (JP-A) No. 4-350643 and 4-303833 disclose the following technique. That is, a first sensor for detecting the density of a portion corresponding to a recording range of a panorama-size image and a second sensor for detecting the density of a predetermined area corresponding to a portion outside the recording range of the panorama-size image and within a recording area of a standard-size image are arranged along the direction (direction perpendicular to a feeding direction) of the width of the negative film, and an image size is determined as a panorama size when the density detected by the second sensor is the base density of the negative film.

Japanese Patent Application laid-Open (JP-A) No. 5-323464 discloses the following technique. That is, the presence/absence of a boundary image at a position corresponding to a boundary of a panorama-size image is detected, data indicating the presence of the boundary image is accumulated along the feeding direction of a photographic film, and the accumulated value is compared with a predetermined value. If the accumulated value is equal to or larger than the predetermined value, an image is determined as a panorama-size image.

However, even if the image size is the standard size, the density of a predetermined area corresponding to a portion outside the recording area of the panorama-size image and within a recording area of a standard-size image has a small value which is close to a film base density when the image is recorded on a negative film in an underexposure condition. Further, even if the image size is the panorama-size, the density of the predetermined area has a value which is considerably different from the base density when the image has fogging or the like outside the recording range of the panorama-size image due to a failure of a camera used in image recording. In the technique described in Japanese Patent Application Laid-Open (JP-A) No. 4-350643 and 4-303833, since an image size is determined on the basis of the density of the predetermined area, the size of the image described above may be erroneously determined.

In Japanese Patent, Application Laid-Open (JP-A) No. 5-323464, how to detect the presence/absence of a boundary image is not described in detail. However, since this publication describes that detection of the presence/absence of the boundary image means detection of a portion (edge portion) where an image signal suddenly changes, it can be determined that a portion where a change in density of an image is equal or larger than a predetermined value is determined as a boundary image. However, in an image recorded on a negative film in an underexposure condition or an image in which fogging occurs outside an image recording range, a change in density in a boundary of the image recording range may be very small. In the detection method described in the above publication, the boundary portion of the panorama-size image recorded as described above cannot be detected, and the image size may be erroneously determined.

The accumulated value of data indicating the presence of a boundary image in the above publication represents the length of an interval in which the data is accumulated in the film feeding direction, i.e., a length of a portion where the boundary image is present along the boundary position of the panorama-size image, and this length is compared with a predetermined value representing a length (e.g., 5 mm) to determine an image size. For this reason, the size of an image which has a standard size but having a portion where a change in density occurs over a predetermined length substantially parallel to the boundary of the image near a position corresponding to the boundary of the panorama-size image is erroneously determined as a panorama size at a high probability.

In the above publication, it is determined whether an image is present in an area corresponding to a portion outside the recording area of a panorama-size image and within a recording area of a standard-size image to compensate for determination of an image size based on the presence/absence of the boundary image. However, the details of a method of determining the presence/absence of the image is not described in this publication. This determination is generally performed by determining that a portion having a density higher than a predetermined density is present in above corresponding area. However, according to this determination, a panorama-size image in which a portion having a predetermined density or more is present by fogging outside the image recording range may be erroneously determined at high probability.

The entire density of an image differs between images, and films of different types have different film base densities. For this reason, when the presence/absence of an image is determined by only checking the presence/absence a portion having a predetermined density or more, accuracy is very low.

The present invention has been made in consideration of the above circumstances, and has as its object to an image size identification apparatus and an image size identification method capable of identifying a size of an image recorded on a photographic film at a high accuracy.

SUMMARY OF THE INVENTION

According to the first aspect of the present invention, an image size identification apparatus includes density measurement means for measuring densities at a large number of measurement points in a measurement area including an image recording range on a photographic film on which an image is recorded, extraction means for extracting an image area estimated to correspond to an image portion from the measurement area on the basis of the densities at the measurement points measured by the density measurement means, and determination means for determining an image size on the basis of a distribution of the image area extracted by the extraction means in the measurement area.

According to the second aspect of the present invention, the extraction means sets the threshold value of a density with reference to at least one of the minimum value and the maximum value of a density at measurement points to extract an area constituted by measurement points having densities which are equal to or larger than the threshold value as the image area.

According to the third aspect of the present invention, the image size identification apparatus further includes base density detection means for detecting a density value of each component color of the film base of the photographic film, wherein the density measurement means resolves the densities at a large number of measurement points in the measurement area into component colors to measure the densities of each component color, and the extraction means extracts an area constituted by the measurement points having different film base colors as the image area on the basis of the density values of the component colors of the film base detected by the base density detection means and the density values of the component colors of the measurement points measured by the density measurement means.

According to the fourth aspect of the present invention, the determination means calculates a presence rate of the image area in each of the plurality of partial area obtained by dividing the measurement area as a distribution of the image area, and determines the size of the image on the basis of the calculated presence rate.

The fifth aspect of the present invention is an image size identification method, including the step of measuring densities at a large number of measurement points in a measurement area including an image recording range on a photographic film on which an image is recorded, the step of extracting an image area estimated to correspond to an image portion from the measurement area on the basis of the densities at the measurement points measured by the density measurement means, and the step of determining an image size on the basis of a distribution of the image area extracted by the extraction means in the measurement area.

In the first aspect, densities at a large number of measurement points in a measurement area including an image recording range on a photographic film on which an image is recorded are measured by the density measurement means, and in the extraction means, an image area estimated to correspond to an image portion from the measurement area is extracted on the basis of the densities at the measurement points measured by the density measurement means. In the determination means, an image size is determined on the basis of a distribution of the image area extracted by the extraction means in the measurement area.

Extraction of the image area can be performed such that the threshold value of a density is set with reference to at least one of the minimum value and maximum value of a density at measurement points to extract an area constituted by measurement points having densities which are equal to or larger than the threshold value as the image area. Various threshold values can be set, for example, a density value larger than the minimum value of the density by a predetermined value, a density value lower than the maximum value of the density by a predetermined value, a density value having a predetermined accumulated value from the minimum value of the density on a density histogram of the densities at measurement points, or a density value having a predetermined accumulated value from the maximum value of the density on the density histogram.

In the photographic film, the minimum value of the density at measurement points is almost equal to the density of the film base, and the maximum value of the density is a value based on the film base density and an exposure amount in image recording. Therefore, when the area is extracted with reference to at least one of the minimum and maximum values or the density at measurement points as described above, even if the film base density or the exposure amount in image recording changes, a proper area corresponding to an actual image portion can be extracted as the image area.

When the photographic film is exposed, a dye is emitted from a coupler to form a color. For this reason, regardless of an exposure amount or the color of the film base, the color of an exposed part contains a color component different from that of the film base color. For this reason, according to the third aspect, the base density detection means for detecting a density value of each component color of the film base of the photographic film is arranged. The density measurement means may resolve the densities at a large number of measurement points in the measurement area into component colors to measure the densities of each component color, and the extraction means may extract an area constituted by the measurement points having different film base colors as the image area on the basis of the density values of the component colors of the film base detected by the base density detection means and the density values of the component colors of the measurement points measured by the density measurement means. The measurement point having a color different from the film base color can be determined such that the densities at the measurement points measured by the density measurement means are compared with the density value of the film base in each color components. Therefore, regardless of the exposure amount in image recording or the color of the film base, a proper area corresponding to the image portion can be extracted as the image area.

Note that when the base density detection means resolves the density of a predetermined portion, such as the leading or trailing end of a photographic film, on the photographic film which is known as an unexposed portion in advance, the density value of each component color of the film base can be detected. In addition, the film bases of photographic films of the same type have the same color. For this reason, the density values of the component colors of film bases are measured and stored in advance in units of the photographic film types, the type of a photographic film to be processed is detected, and a measurement value corresponding to the detected type is read. In this manner, the density values of the component colors of the film bases can be detected. However, when a photographic film which is discolored by timed degradation may be processed, the above actual measurement of a density value of each component color is preferably performed because an accurate value can be obtained.

In the present invention, the size of an image is determined on the basis of the distribution of an image area extracted as described above. For this reason, even for an image, in which a change in density in a boundary of the image recording range is very small, such as an image recorded on a negative film serving as a photographic film in an underexposure condition (or on a reversal film in an overexposure condition) or an image in which fogging occurs outside an image recording range, once a range approximated to an actual image recording range serving as an image area is extracted, the size of the image recorded on the photographic film can be accurately determined.

When fogging occurs outside an image recording range, a portion exposed by fogging may be extracted as an image range. However, as described above, according to the present invention, the size of an image is determined on the basis of the distribution of an image area. For this reason, when the size of a portion outside the image recording range exposed by the fogging and extracted as the image range is relatively small, the portion can be determined as a portion exposed by fogging, and the size of the image can be accurately determined. Therefore, the size of an image recorded on a photographic film can be identified at a high accuracy.

Determination of an image size by the determination means on the basis of the distribution of the image area can be performed, for example, on the basis of the size and shape of a figure circumscribed to the image area and its position in the measurement area. As in the fourth aspect, by deriving the presence rate of the image area in each of a plurality of partial areas obtained by dividing the measurement area, the image size is determined on the basis of the presence rate. In this case, the distribution of the image area can be determined with a simple process, and the image size can be preferably determined.

In addition, assume that at least one of the plurality of partial areas is an area which is in an image recording range of a first size image and is outside the image recording range of a second size different from the first size. In this case, on the basis of the presence rate of the image area in that area, it can be simply identified at a high accuracy whether the image size is the first size or the second size.

In the fifth aspect, densities at a large number of measurement points in a measurement area including an image recording range on a photographic film on which an image is recorded are measured, an image area estimated to correspond to an image portion from the measurement area is extracted on the basis of the measured densities at the measurement points, and an image size is determined on the basis of a distribution of the extracted image area in the measurement area. As in the first aspect, the size of the image recorded on the photographic film can be identified at a high accuracy.

According to the sixth aspect of the present invention, an image size identification apparatus includes density measurement means for measuring, in a photographic film on which an image is recorded, a density at a position in a determination area including a predetermined area which is in an image recording range when the image has a predetermined image size and which is outside the image recording range when the image has another image size different from the predetermined image size, calculation means for calculating the degree of dispersion of a density at each position in the determination area or the degree of dispersion of a density change amount at each position on the basis of the density at each position in the determination area measured by the density measurement means, and determination means for determining the image size on the basis of the degree of dispersion of the densities or density change amounts calculated by the calculation means.

According to the seventh aspect of the present invention, in the sixth aspect, the calculation means calculates the average value of the densities or density change amounts at each position in the determination area, and the determination means determines the image size in consideration of the average value of the densities or density change amounts calculated by the calculation means.

According to the eighth aspect of the present invention, an image size identification method includes the step of measuring, in a photographic film on which an image is recorded, a density at a position in a determination area including a predetermined area which is in an image recording range when the image has a predetermined image size and which is outside the image recording range when the image has another image size different from the predetermined image size, the step of calculating the degree of dispersion of a density at each position in the determination area or the degree of dispersion of a density change amount at each position on the basis of the measured density at each position in the determination area, and the step of determining the image size on the basis of the calculated degree of dispersion of the densities or density change amounts.

According to the ninth aspect of the present invention, in the eighth aspect, the image size identification method includes the step of calculating the average value of the densities or density change amounts at each position in the determination area, and the step of determining the image size in consideration of the calculated average value of the densities or density charge amounts.

According to the sixth aspect, in a photographic film on which an image is recorded, a density at a position in a determination area including a predetermined area which is in an image recording range when the image has a predetermined image size and which is outside the image recording range when the image has another image size different from the predetermined image size is measured by the density measurement means, the calculation means calculates the degree of dispersion of a density at each position in the determination area or the degree of dispersion of a density change amount at each position on the basis of the measured density at each position in the determination area, and the determination means determines the image size on the basis of the degree of dispersion of the densities or density change amounts calculated by the calculation means.

Note that a physical value such as a variance or a standard deviation can be used as the degree of dispersion of the value. Although the determination area need include only at least the predetermined area, an area rate of the predetermined area occupied in the determination area is desirably set to be high, and it is most desirable that the determination area is constituted by the predetermined area. In the sixth aspect, the degree of dispersion of the densities or density change amounts is used as the characteristic value of an image. If the dispersion is high, an image is present in the predetermined area at high probability, and the size of the image recorded on the photographic film is determined as the size of an image in which the predetermined area serves as the image recording range.

According to the sixth aspect, the image having the predetermined area which is unexposed or exposed by fogging can be clearly identified from the image having the predetermined area which is exposed, and the size of an image in which a density change pattern is present substantially parallel to a boundary of the image at a predetermined position in the image recording range can be identified without being influenced by the density change pattern. For this reason, the size of an image recorded on the photographic film can be identified at a high accuracy.

In the size of the image having the predetermined area which is not an image area, the degree of dispersion and average value of the densities or density change amounts in the predetermined area frequently falls within a predetermined range. For this reason, according to the seventh aspect, when the average value of the densities or density change amounts at each position in the predetermined area is calculated by the calculation means, and the determination means determines the image size in consideration of the calculated average value of the densities or density change amounts, the accuracy of identification of an image size can be more improved.

In determination of an image size according to the present invention, either the density or density change value at each position in the measurement range may be used. The entire density of an image differs between images, and films of different types have different film base densities. When it is considered that the average value of the density in the measurement range is changed by the entire density change, a method of determining an image size by using the degree of dispersion (and average value) of the value of the change amount in the measurement range is preferably used because this method is not easily influenced by the change in entire density of an image and the change in film base density.

In the eighth aspect, a density at a position in a determination area including a predetermined area which is in an image recording range when the image has a predetermined image size and which is outside the image recording range when the image has another image size different from the predetermined image size is measured, the degree of dispersion of a density at each position in the determination area and the value of a density change amount at each position is calculated, and the image size is determined on the basis of the calculated degree of dispersion of the densities or density change amounts. For this reason, as in the sixth aspect, the image having the predetermined area which is unexposed or exposed by fogging can be clearly identified from the image having the predetermined area which is exposed, and the size of an image in which a density change pattern is present substantially parallel to a boundary of the image at a predetermined position in the image recording range can be identified without being influenced by the density change pattern. For this reason, the size of an image recorded on the photographic film can be identified at a high accuracy.

According to the ninth aspect, in the eighth aspect, the average value of the densities or density change amounts at each position in the determination area is also calculated, and the image size is determined in consideration of the calculated average value of the densities or density change amounts. Therefore, as in the seventh aspect, the accuracy of identification of an image size can be more improved.

According to the tenth aspect of the present invention, an image size identification apparatus includes density measurement means for measuring densities at a large number of positions in a measurement area including an image recording range on a photographic film on which an image is recorded, classification means for classifying, on the basis of the densities at the larger number of positions measured by the density measurement means, the image recorded on the photographic film into an image in which the range of a portion having a relatively low density is large in the measurement area or an image in which the range of the low density portion is narrow, extraction means for extracting an image area estimated to correspond to an image portion from the measurement area in the image classified as an image having a wide low-density portion by the classification means on the basis of the densities at the large number of measurement points, first determination means for determining an image size on the basis of a distribution, in the measurement area, of the image area extracted by the extraction means, calculation means for calculating, in the image classified as the image having a narrow low-density portion by the classification means, on the basis of a density at each position in a determination area including a predetermined area on the photographic film which is in an image recording range when the image size is a first image size and which is outside the image recording range when the image size is a second image size different from the first image size, the degree of dispersion of densities or density change values at each position in the determination area, and a second determination means for determining the image size on the basis of the degree of dispersion of the density and density change amount calculated by the calculation means.

According to the eleventh aspect of the present invention, an image size identification apparatus includes density measurement means for measuring densities at a large number of positions in a measurement area including an image recording range on a photographic film on which an image is recorded, classification means for classifying, on the basis of the densities at the larger number of positions measured by the density measurement means, images recorded on the photographic film into an image in which the difference between a density in a first predetermined area on the photographic film which is in an image recording range when an image size is a first image size and which is outside the image recording range when the image size is a second image size different from the first image size and a density in a second predetermined area on the photographic film which is in the image recording range when the image size is any size is large, or an image in which the difference is small, extraction means for extracting an image area estimated to correspond to an image portion from the measurement area in the image classified as an image in which the difference is large by the classification means on the basis of the densities at the large number of measurement points, first determination means for determining an image size on the basis of a distribution, in the measurement area, of the image area extracted by the extraction means, calculation means for calculating, in the image classified as the image in which the difference is small by the classification means, on the basis of a density at each position in the determination area including the first predetermined area, the degree of dispersion of densities or density change values at each position in the determination area, and a second determination means for determining the image size on the basis of the degree of dispersion of the density and density change amount calculated by the calculation means.

According to the twelfth aspect of the present invention, an image size identification method includes the step of measuring densities at a large number of positions in a measurement area including an image recording range on a photographic, film on which an image is recorded, the step of classifying, on the basis of the measured densities at the larger number of measurement positions, the image recorded on the photographic film into an image in which the range of a portion having a relatively low density is wide in the measurement area or an image in which the range of the low density portion is narrow, the step of extracting an image area estimated to correspond to an image portion from the measurement area in the image classified as an image having a wide low-density portion on the basis of the densities at the large number of measurement points, the step of determining an image size on the basis of a distribution, in the measurement area, of the extracted image area, the step of calculating, in the image classified as the image having a narrow low-density portion, on the basis of a density at each position in a determination area including a predetermined area on the photographic film which is in an image recording range when the image size is a first image size and which is outside the image recording range when the image size is a second image size different from the first image size, the degree of dispersion of densities or density change values at each position in the determination area, and the step of determining the image size on the basis of the calculated degree of dispersion of the density and density change amount.

According to the thirteenth aspect of the present invention, an image size identification method includes the step of measuring densities at a large number of positions in a measurement area including an image recording range on a photographic film on which an image is recorded, the step of classifying, on the basis of the measured densities at the larger number of positions, images recorded on the photographic film into an image in which the difference between a density in a first predetermined area on the photographic film which is in an image recording range when an image size is a first image size and which is outside the image recording range when the image size is a second image size different from the first image size and a density in a second predetermined area on the photographic film which is in the image recording range when the image size is any size is large, or an image in which the difference is small, the step of extracting an image area estimated to correspond to an image portion from the measurement area in the image classified as an image in which the difference is large on the basis of the densities at the large number of measurement points, the step of determining an image size on the basis of a distribution, in the measurement area, of the extracted image area, the step of calculating, in the image classified as the image in which the difference is small, on the basis of a density at each position in the determination area including the first predetermined area, the degree of dispersion of densities or density change values at each position in the determination area, and the step of determining the image size on the basis of the calculated degree of dispersion of the density and density change amount.

In the tenth aspect, densities at a large number of positions in a measurement area including an image recording range on a photographic film on which an image is recorded are measured by the density measurement means, and the classification means classifies, on the basis of the measured densities at the larger number of measurement positions, the image recorded on the photographic film into an image in which the range of a portion having a relatively low density is wide in the measurement area or an image in which the range of the low density portion is narrow. The classification by the classification means is performed such that a density histogram is formed on the basis of the measured densities at the large number of position, and it is checked whether a density value at which an accumulated value of population from the maximum or minimum value of a density on the density histogram is equal to or larger than a predetermined value. The classification may be performed by using only a density in a predetermined area which is in the image recording range in the first image size and which is outside the image recording range in the second image size.

According to the tenth aspect, an image recorded on a photographic film at a standard exposure amount and having an image size of a narrow recording range is classified as an image having a wide low-density portion. In addition, an image recorded on a negative film serving as a photographic film in an underexposure (or on a reversal film in an overexposure) condition may be classified as an image having a wide low-density portion at high probability regardless of its image size. However, an image of this type has a very small change in density in a boundary of an image recording range, and a change in density in the image recording range is not clear. For this reason, the difference between deviations of density change values of different image sizes does not easily occur. For this reason, the extraction means extracts, in the image classified as an image having a wide low-density portion, and image area estimated to correspond to an image portion from the measurement area on the basis of the densities at a large number of positions, and the first determination means determines an image size on the basis of a distribution of the extracted image area in the measurement area.

Note that, in extraction of an image area, the threshold value of a density is set with reference to one of the minimum value and maximum value of the densities at a large number of positions, and a portion having a density which is equal to or larger than the threshold value in the measurement area can be extracted as an image area. As the threshold value, for example, a value larger than the minimum value of the density by a predetermined value or a value smaller than the maximum value of the density by a predetermined value can be set. In addition, a histogram of the measured densities is formed, and a density value in which an accumulated value from the minimum value or maximum value of the densities on the density histogram is a predetermined value. The minimum value of the density on the photographic film is almost equal to the density of the film base, and the maximum value of the density is a value based on the film base density and an exposure amount in image recording. Therefore, when an image area is extracted with reference to at least one of the minimum and maximum values of the density, even if the film base density or the exposure amount in image recording changes, a proper area corresponding to an actual image portion can be extracted as the image area.

The image size identification apparatus further includes base density detection means for detecting a density value of each component color of the film base of the photographic film, the density measurement means may resolve the densities at a large number of measurement points into component colors to measure the densities, and the extraction means may extract a portion having a color different form that of the film base in the measurement range on the basis of the densities of the component colors of the film base and the density values of the component colors at the large number of positions measured by the density measurement means. The position having a color different from that of the film base can be determined such that the densities at the large number of positions measured by the density measurement means are compared with the densities of the component colors of the film base. Therefore, a proper area corresponding to an actual image portion can be extracted as the image area regardless of the exposure amount in image recording or the color of the film base.

In this manner, even if a boundary of the image recording region or a change in density within the image recording range are very small, and even if an image classified as an image having a wide low-density portion is an image recorded on a photographic film in an underexposure (or on a reversal film in an overexposure) condition, the size of the image recorded on the photographic film can be accurately determined on the basis of a distribution of an image area which coincides with or approximates to an actual image recording range.

Determination of an image size by the determination means on the basis of the distribution of the image area can be performed on the basis of the size and shape of a figure circumscribed to the image area and its position in the measurement area. However, by deriving the presence rate of the image area in each of a plurality of partial areas obtained by dividing the measurement area, the image size is determined on the basis of the presence rate. In this case, the distribution of the image area can be determined with a simple process, and the image size can be preferably determined.

An image recorded on a photographic film at a standard exposure amount and having an image size of a narrow recording range is classified as an image having a narrow low-density portion. In addition, an image in which a portion having a density equal to or higher than a predetermined density is present outside the image recording range may be classified as an image having a narrow low-density portion at high probability. In the present invention, in the image classified as an image having a narrow low-density portion, the calculation means calculates the degree of dispersion of densities or density change values at each position in the determination area on the basis of a density at each position in a determination area including a predetermined area on the photographic film which is in an image recording range when the image size is a first image size and which is outside the image recording range when the image size is a second image size different from the first image size. The second determination means determines the image size on the basis of the calculated degree of dispersion of the density and density change amount.

Note that a physical value such as a variance or a standard deviation can be used as the degree of dispersion of the value. For this reason, the image having the predetermined area which is unexposed or exposed by fogging can be clearly identified from the image having the predetermined area which is exposed. Since either of the determination of an image size by the calculation means and the second determination means and the determination of an image size by the extraction means and the first determination means is not performed by detecting an image boundary, the size of an image in which a density change pattern is present substantially parallel to a boundary of the image at a predetermined area in the image recording range can be identified without being influenced by the density change pattern.

An image having a portion outside the image recording range exposed by the fogging may be classified as an image having a wide low-density portion depending on an exposure amount in image recording. However, the area of the portion exposed by fogging in an image of such a type is generally small. For this reason, when the image having the portion outside the image recording range exposed by fogging is classified as an image having a narrow low-density portion, and the portion exposed by fogging is extracted as an image area by the extraction means, the first determination means can accurately determine the size at high probability on the basis of the distribution of the image area.

Therefore, according to the present invention, the size of an image recorded on a photographic film can be identified at a high accuracy regardless of an exposure amount set when the image is recorded on the photographic film, the presence/absence of a portion exposed by fogging or the like outside the image recording range, or the like.

In the size of the image having the predetermined area which is not an image area, the degree of dispersion and average value of the densities or density change amounts in the predetermined area frequently falls within a predetermined range. For this reason, when the average value of the densities or density change amounts at each position in the predetermined area is calculated by the calculation means, and the determination means determines the image size in consideration of the calculated average value of the densities or density change amounts, the accuracy of identification of an image size can be more improved.

Note that, in determination of an image size by the second determination means, either the density or density change value at each position in the measurement range may be used. The entire density of an image differs between images, and films of different types have different film base densities. When it is considered that the average value of the density in the measurement range is changed by the entire density change, a method of determining an image size by using the degree of dispersion (and average value) of the value of the change amount in the measurement range is preferably used because this method is not easily influenced by the change in entire density of an image and the change in film base density.

In an image recorded on a negative film serving as a photographic film in an underexposure condition, if the underexposure condition is not extreme, the density of a portion (e.g., main portion) in the image is high, the density of another portion (e.g., background portion) is very low in many cases, and the portion having a high density is often present near the central portion of the image.

In consideration of the above, according to the eleventh aspect, in place of the classification means in the tenth aspect, there is provided the classification means for classifying, on the basis of the densities at the larger number of positions measured by the density measurement means, images recorded on the photographic film into an image in which the difference between a density in a first predetermined area on the photographic film which is in an image recording range when an image size is a first image size and which is outside the image recording range when the image size is a second image size different from the first image size and a density in a second predetermined area on the photographic film which is in the image recording range when the image size is any size is large, or an image in which the difference is small. Determination of an image size by the extraction means and the first determination means is performed to an image classified as an image in which the difference is large, and determination of an image size by the calculation means and the second determination means is performed to an image classified as an image in which the difference is small.

In the eleventh aspect, as an image in which the difference between a density in the first predetermined range and a density in the second predetermined area is large, an image having the second size which is recorded on a negative film serving as, e.g., a photographic film at an exposure amount equal to or larger than the standard exposure amount, an image (e.g., an image recorded in an underexposure condition on a negative film serving as a photographic film) in which a high-density portion is present in only the image recording range of the second image size, or the like are classified. The sizes of these images are determined by the extraction means and the first determination means.

As an image in which the difference between a density in the first predetermined range and a density in the second predetermined area is small, an image having the first size which is recorded on a negative film serving as, e.g., a photographic film at an exposure amount equal to or larger than the standard exposure amount, an image in which a high-density portion is present outside the image recording range of the second image size by fogging or the like, or the like are classified. The image sizes of these images are determined by the calculation means and the second determination means. In this manner, images can be classified by the classification means according to the eleventh aspect in the same manner as that of the classification means according to the tenth aspect. For this reason, as in the tenth aspect, the size of an image recorded on a photographic film can be identified at a high accuracy regardless of an exposure amount set when the image is recorded on the photographic film, the presence/absence of a portion exposed by fogging or the like outside the image recording range, or the like.

According to the twelfth aspect, a density in a measurement area including an image recording range on a photographic film is measured, on the basis of the measured density, the image recorded on the photographic film is classified into an image in which the range of a portion having a relatively low density is wide in the measurement area or an image in which the range of the low density portion is narrow, an image area estimated to correspond to an image portion from the measurement area in the image classified as an image having a wide low-density portion is extracted, the size of an image is determined on the basis of a distribution of the extracted image area within the measurement area, the degree of dispersion of densities or density change values at each position in the determination area is calculated in the image classified as the image having a narrow low-density portion on the basis of a density at each position in a determination area including a predetermined area on the photographic film which is in an image recording range when the image size is a first image size and which is outside the image recording range when the image size is a second image size different from the first image size, and the image size is determined on the basis of the calculated degree of dispersion of the density or density change amount. Therefore, as in the tenth aspect, the size of the image recorded on the photographic film can be identified at a high accuracy.

According to the thirteenth aspect, a density in a measurement area including an image recording range on a photographic film is measured, on the basis of the measured density, the image recorded on the photographic film is classified into an image in which the difference between a density in a first predetermined area on the photographic film which is in an image recording range when an image size is a first image size and which is outside the image recording range when the image size is a second image size different from the first image size and a density in a second predetermined area on the photographic film which is in the image recording range when the image size is any size is large, or an image in which the difference is small, an image area estimated to correspond to an image portion is extracted from the measurement area in the image classified as an image in which the difference is large, an image size is determined on the basis of a distribution of the extracted image area in the measurement area, the degree of dispersion of densities or density change amounts at each position in the determination area is calculated on the basis of a density at each position in the determination area including the first predetermined area, and the image size is determined on the basis of the calculated degree of dispersion of the density and density change amount. Therefore, as in the eleventh aspect, the size of the image recorded on the photographic film can be identified at a high accuracy.

BRIEF DESCRIPTION OF THE DRAWINGS

FIGS. 4A and 4B is a flow chart for an image determining process of the first embodiment;

FIG. 6A shows a standard-size image recorded on a negative film, FIG. 6B is a view showing an image representing a calculation result of the density change value, FIG. 6C is a graph showing a result of accumulating density change values along a film width direction for measurement point strings arranged in a film longitudinal direction, and FIG. 6D is a graph showing a result of accumulating density change values along a film longitudinal direction for measurement point strings arranged in a film width direction;

FIG. 7A shows a panorama-size image recorded on a negative film, FIG. 7B is a view showing an image representing a calculation result of the density change value, FIG. 7C is a graph showing a result of accumulating density change values along a film width direction for measurement point strings arranged in a film longitudinal direction, and FIG. 7D is a graph showing a result of accumulating density change values along a film longitudinal direction for point strings arranged in a film width direction;

FIG. 8 is a plan view of a negative film showing the ranges of a standard image present area F, a panorama edge present area P, and a central portion image area C within a density measurement area;

FIG. 9A shows a standard-size image of a firework scene recorded on a negative film, FIG. 9B is a view showing an image representing a calculation result of the density change value, FIG. 9C is a graph showing a result of accumulating density change values along a film width direction for measurement point strings arranged in a film longitudinal direction, and FIG. 9D is a graph showing a result of accumulating density change values along a film longitudinal direction for measurement point strings arranged in a film width direction;

FIG. 10 is a graph showing a histogram of a density value at each measurement point used for determining a threshold value in binarization;

FIG. 13A is a graph showing a result of calculating, for a standard-size image, the variance and average value of a density change value in the areas A and B outside a panorama-size image region, and FIG. 13B is a graph showing a result of calculating, for a panorama-size image, the variance and average value of a density change value in the areas A and B outside a panorama-size image region;

FIGS. 16A and 16B is a flow chart for the image size determining process of the second embodiment;

FIG. 20 is a conceptual view showing the positions of measurement point strings A and B used to determine a density outside the image recording range of a panorama-size image, and a result obtained by comparing the density value at each measurement point constituting the measurement point strings A and B with a threshold value;

DESCRIPTION OF THE EMBODIMENTS

Embodiments of the present invention will be described below with reference to the accompanying drawings.

[First Embodiment]

Figure 1:
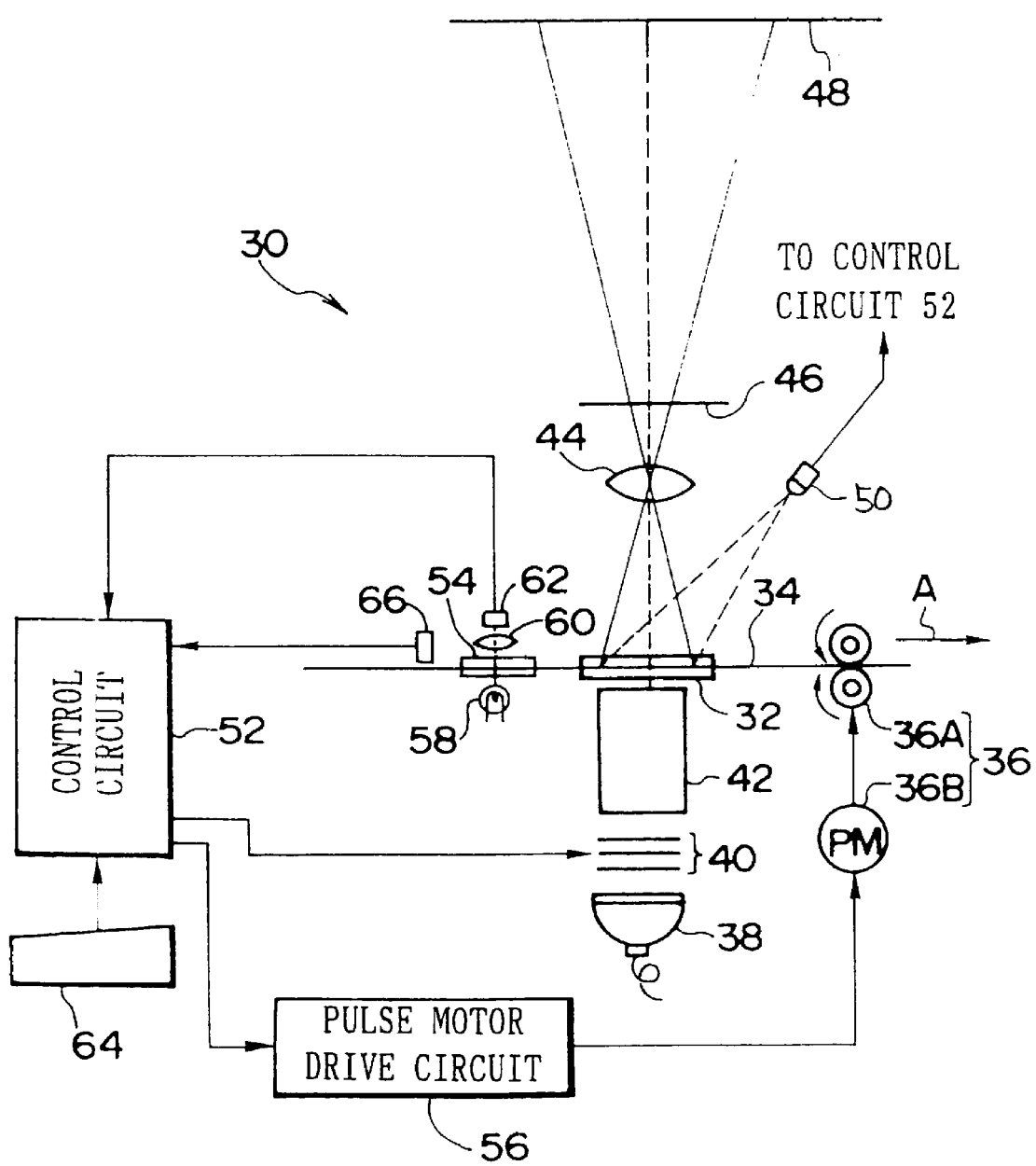
FIG. 1 is a view showing the arrangement of a photograph printing apparatus according to the first embodiment.

FIG. 1 shows a photograph printing apparatus 30 comprising a film image detection device according to the present invention. In the photograph printing apparatus 30, a lamp house 38 serving as an exposure light source having a halogen lamp and a reflector for reflecting light rays emitted from the halogen lamp upward is arranged. A light-adjusting filter section 40 having C (cyan), M (magenta), and Y (yellow) light-adjusting filters and a light-diffusion box 42 are sequentially arranged above the lamp house 38.

An exposure stage 32 through which a developed negative film 34 (corresponding to a photographic film of the present invention) set in the photograph printing apparatus 30 passes is arranged above the light-diffusion box 42, and a lens 44, a black shutter 46, and a printing paper 48 are sequentially arranged above the exposure stage 32. The exposure stage 32 has an opening formed therein, and comprises variable negative mask (not shown) which can change the opening depending on the size of an image recorded on the developed negative film 34. Light rays emitted from the lamp house 38 and passing through the light-adjusting filter section 40 and the light-diffusion box 42 passes through the developed negative film 34 through the opening of the variable negative mask, and are focused on the printing paper 48 by the lens 44.

Obliquely above the exposure stage 32, a photometer 50 having a direction inclined with respect to the optical axis of the light rays emitted from the lamp house 38 is arranged at a position where a photometric operation can be performed to an image recorded on the developed negative film 34. The photometer 50 is constituted by a two-dimensional image sensor or the like. The photometer 50 divides the image recorded on the developed negative film 34 into a plurality of pixels, resolves the light rays passing through each pixel into R, G, and B component colors, and measures the quantity of light of each component color light. Although not shown, the photometer 50 is connected to a control circuit 52, and outputs a photometric value obtained by the measurement to the control circuit 52.

A feeding section 36 and a photometric stage 54 which sandwich the exposure stage 32 are arranged adjacent to the exposure stage 32. The feeding section 36 comprises a pair of feeding rollers 36A for holding the developed negative film 34 therebetween and a pulse motor 36B for rotating the feeding rollers 36A. The pulse motor 36B rotates the feeding rollers 36A to feed the developed negative film 34 in the direction indicated by an arrow A in FIG. 1. The pulse motor 36B is connected to the control circuit 52 through a pulse motor drive circuit 56.

Figure 2:
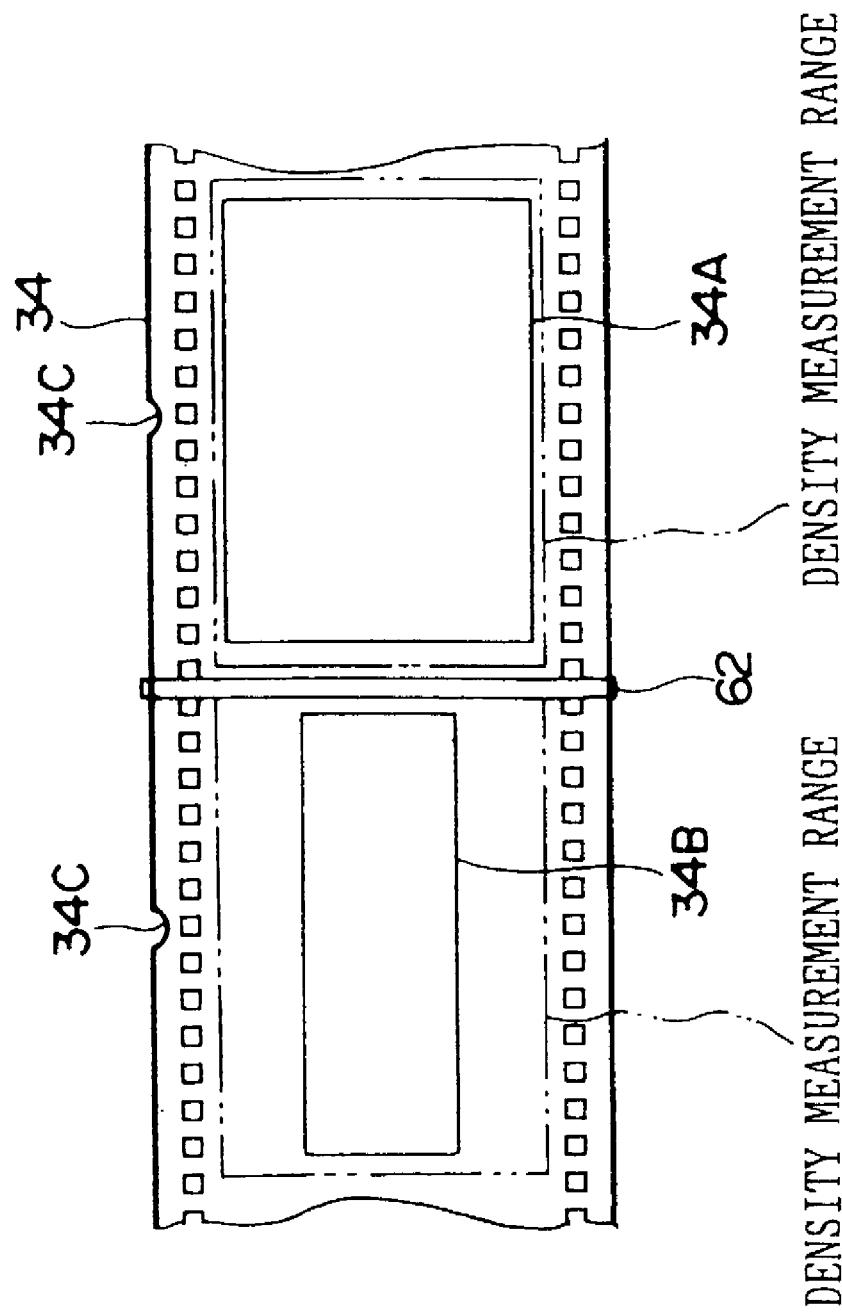
FIG. 2 is a plan view showing a negative film and a line sensor.

A light source lamp 58 is arranged below the photometric stage 54, and a lens 60 and a line sensor 62 serving as the density measurement means of the present invention are sequentially arranged above the photometric stage 54. As shown in FIG. 2, the line sensor 62 is constituted by arranging a large number of light-receiving elements in a predetermined direction which coincides with the width direction of the developed negative film 34. A rectangular opening corresponding to the line sensor 62 and having a longitudinal direction which is the same as the arrangement direction of the light-receiving elements of the line sensor 62 is formed in the photometric stage 54. Light rays emitted from the light source lamp 58 pass through the feeding section 36 through the opening, and are focused on the light-receiving surface of each light-receiving element of the line sensor 62 by the lens 60.

The line sensor 62 causes the light-receiving elements to measure quantities of light passing through different portions of the developed negative film 34. The line sensor 62 is connected to the control circuit 52, and outputs photometric values obtained by the measurement to the control circuit 52. The control circuit 52 comprises a microcomputer having a CPU and a memory such as a ROM or a RAM, and a keyboard 64 for inputting various data or commands is connected to the control circuit 52.

A notch sensor 66 is arranged on the upstream of the photometric stage 54. The negative film 34 subjected to a process such as a developing process by a developing apparatus (not shown) is subjected to the image approving step and then set in the photograph printing apparatus 30. In the image approving step, an image recorded on the developed negative film 34 is visually checked by an operator to determine whether the image is printed on a printing paper. As shown in FIG. 2, with respect to the image which is determined as an image to be printed, a notch 34C is formed at a position corresponding to one end in the film width direction. The notch sensor 66 detects the notch 34C formed in the negative film 34. The notch sensor 66 is connected to the control circuit 52 to output a detection result to the control circuit 52.

The function of the first embodiment will be described below. As shown in FIG. 2, in addition to a standard-size (so-called full-size) image 34A, an image 34B (in this embodiment, a panorama-size image) having the same longitudinal dimension as that of the standard-size image and an aspect ratio smaller than that of the standard-size image are recorded on the developed negative film 34 according to this embodiment. In the photograph printing apparatus 30, a negative film on which only the standard-size image 34A is recorded, a negative film on which the panorama-size image 34B is recorded, or a negative film on which the standard-size image 34A and the panorama-size image 34B are recorded is set.

Figure 3:
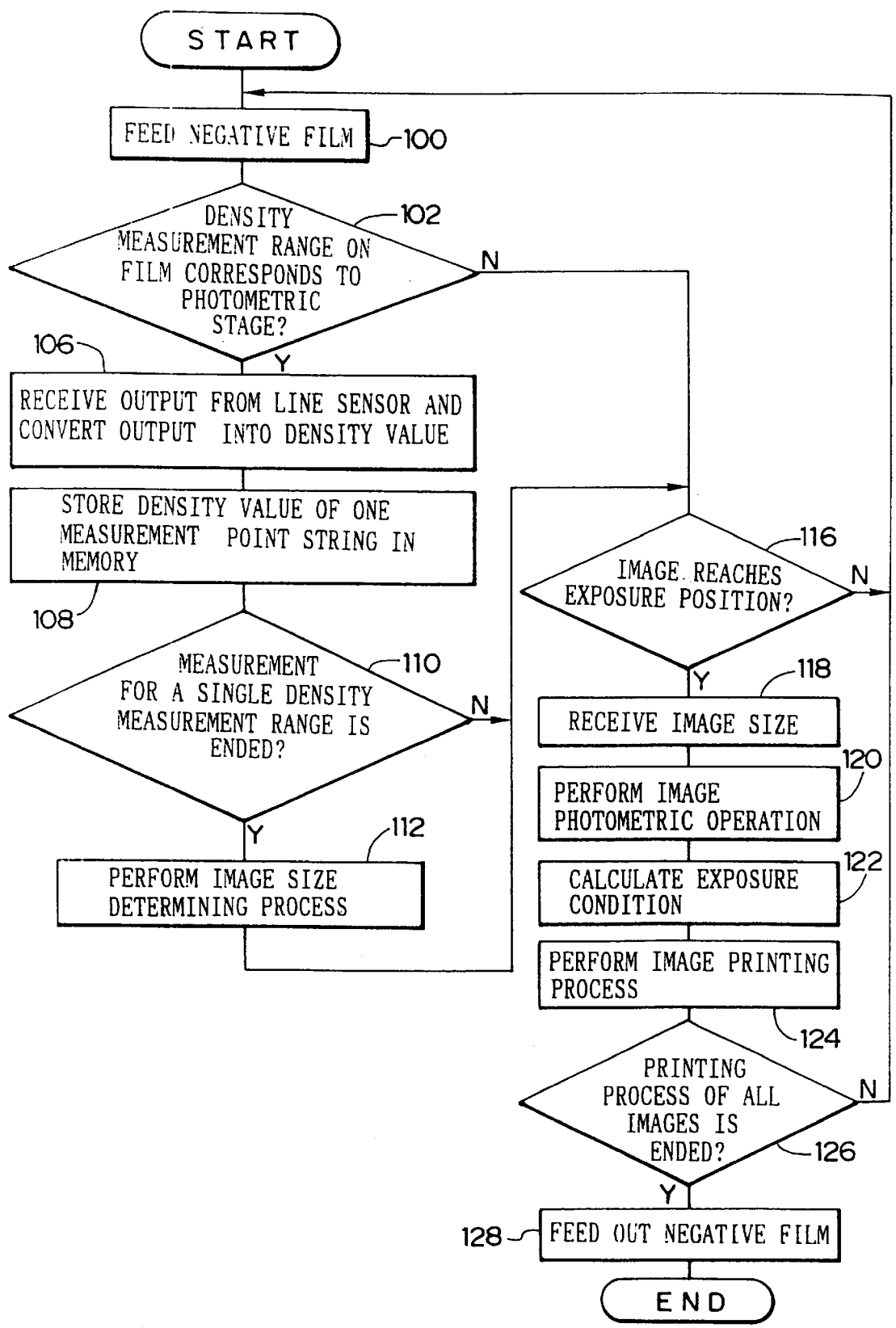
FIG. 3 is a flow chart for a measuring process of the density of a negative film of the first embodiment and a printing process.

Measurement of the density of a negative film performed by the photometric stage 54 will be described below with reference to the flow chart in FIG. 3. Note that the process shown in FIG. 3 is executed by the control circuit 52 when the developed negative film 34 is set in the photograph printing apparatus 30 to instruct the photograph printing apparatus 30 to execute a printing process.

In step 100, a pulse motor 36B is driven through the pulse motor drive circuit 56 to feed the developed negative film 34. In step 102, it is determined whether the density measurement area of the negative film 34 corresponds to the photometric stage 54.

As indicated by an imaginary line in FIG. 2, the density measurement area is set to be a range which is larger than the image recording ranges of the standard-size image 34A and the panorama-size image 34B and includes an image recording range. On the other hand, the notch 34C is formed at an almost constant position corresponding to an image to be printed. For this reason, whether the density measurement area corresponds to the photometric stage 54 can be determined on the basis of the detection result from the notch sensor 66 and a feeding amount of the negative film 34 after the notch 34C is detected by the notch sensor 66.

If NO in this determination, the flow is shifted to step 116 to determine whether the image reaches an exposure position corresponding to the exposure stage 32. If NO in step 116, the flow returns to step 100 to continuously performing the feeding operation of the negative film 34.

If NO in step 102, the flow is shifted to step 106 to receive a photometric value (an amount of light passing through a plurality of measurement points arranged along the film width direction in the density measurement area) output from the line sensor 62. After the received photometric value is converted into a density value, a density value obtained in next step 108 is stored in a memory (not shown) of the control circuit 52 as a density value at each measurement point constituting a single measurement point string. In step 110, it is determined whether measurement over a single density measurement area is ended. If NO in step 110, the flow is shifted to step 116.

As described above, the processes in steps 100, 106, and 108 are repeated until the density values at all the measurement points in the single density measurement area are stored. If YES in step 110, the image size determining process is started in step 112, and the flow is shifted to step 116.

Figure 4A:
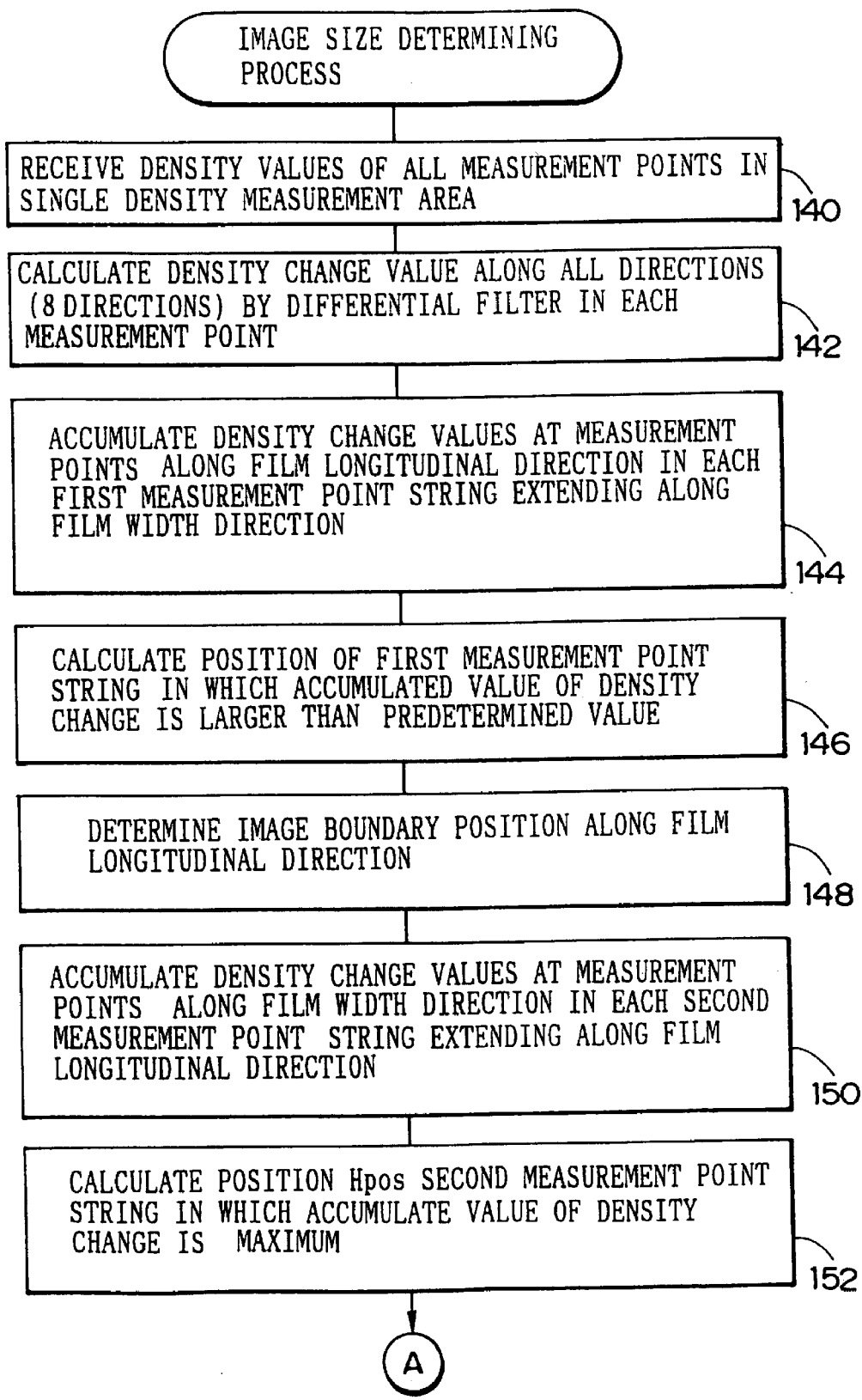

This image size determining process will be described below with reference to the flow chart in FIGS. 4A and 4B. In step 140, the density values at all the measurement points in the single density measurement area are received. In step 142, density change values along directions (total of eight directions: indicated in FIG. 5 as eight arrows having different directions) from each measurement points to eight measurement point therearound are calculated by using differential filters. The eight differential filters for respectively calculating the density change values along the eight directions are shown in FIG. 5.

Figure 5:
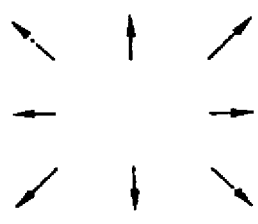
FIG. 5 is a conceptual view showing a differential filter for calculating a density change value.

For example, when a density change value along a predetermined direction is to be calculated, a differential filter indicated by an arrow of the predetermined direction in the eight arrows shown in FIG. 5 is used, and the density value at a measurement point to be calculated and the density values at the eight measurement points (eight-near measurement points) which are present around the measurement point to be calculated are multiplied by the numerical value of the differential filter as a coefficient to calculate the sum of these values. In this manner, the density change value along the predetermined direction can be calculated. Since the calculation is performed by eight differential filters corresponding to the respective directions, the density change value along each direction at a single measurement point can be calculated.

The above processes are performed to a standard-size image shown in FIG. 6A and a panorama-size image shown in FIG. 7A, and the resultant density change values converted into density values (the density value is increased with an increase in density change value) and displayed as an image. In this case, images shown in FIGS. 6B and 7B are obtained. As is apparent from FIGS. 6b and 7B, it is understood that the edge (a portion where a density changes) of an original image is extracted by the above processes.

In step 144, the density change values in two directions (e.g., right and left direction in FIG. 5) along the negative film longitudinal direction at measurement points are accumulated for measurement point strings (to be conveniently referred to as a first measurement point string hereinafter) arranged along a film width direction. In next step 146, the position of the first measurement point string on the negative film 34, at which the accumulated value of density change is equal to or larger than a predetermined value is calculated. In next step 148, the positions of the boundaries of both ends of the image in the film longitudinal direction are determined on the basis of the calculated position.

For example, the density change values of the images shown in FIGS. 6A and 7A are accumulated for the first measurement point strings, results shown in FIGS. 6D and 7D are obtained. As is apparent from FIGS. 6D and 7D, the accumulated values of density change values at portions corresponding to the boundaries of both ends of the image in the film longitudinal direction are large values. Therefore, the position of the first measurement point string in which the accumulated value of density change is equal to or larger than the predetermined value can be regarded as the boundary of each end of the image in the film longitudinal direction.

Depending on the contents of a recorded image, the accumulated value of density change may be equal to or larger than the predetermined value in plural of first measurement point strings. However, according to this embodiment, the interval between the boundaries of both ends of each image in the film longitudinal direction is constant regardless of an image size, and the approximate positions of the boundaries of both ends of the image in the film longitudinal direction can be estimated on the basis of the position of the notch 34C detected by the notch sensor 66. Therefore, a pair of first measurement point strings which correspond to the boundaries of both ends of the image in the film longitudinal direction at high probability can be selected on the basis of the interval, prestored in the memory, between the boundaries of both ends of the image in the film longitudinal direction, an interval between a pair of first measurement point strings on the negative film, and the approximate boundary positions which are estimated. The positions of the selected pair of first measurement point strings can be used as the boundary positions of both the ends of the image in the film longitudinal direction.

In next step 150, the density change values in two directions (e.g., up and down direction in FIG. 5) along the film width direction at measurement points are accumulated for measurement point strings (to be conveniently referred to is a second measurement point string hereinafter) arrange along a film longitudinal direction. For example, the results of accumulating the density change values for second measurement point strings with respect to the images shown in FIGS. 6A and 7A are shown in FIGS. 6C and 7C, respectively. In step 152, a position $H_{POS}$, on the developed negative film 34, of the second measurement point string at which the maximum accumulated value of density change can be obtained by the above calculation is derived.

As shown in FIG. 8, according to this embodiment, the density measurement area is classified into a standard image present area F, a panorama edge present area P, and a central portion image area C. The panorama edge present area P is an area in which, when an image recorded on the developed negative film 34 has a panorama size, the boundaries of the film width direction end portions of the image are located. The standard image present area F is located outside the panorama edge present area P in the film width direction, and is an area in which when the image is located an image recorded on the developed negative film 34 has a standard size. The central portion image area C inside the panorama edge present area P in the film width direction, and is an area in which an image is present regardless of its size. In next step 152, the process is branched depending on a specific area in which the position $H_{POS}$ calculated above is located.

When the position $H_{POS}$ is located in the standard image present area F, it can be determined that an image is present in the standard image present area F. For this reason, the flow is shifted to step 174 to determine that the size of the image recorded on the developed negative film 34 is a standard size, and the image size determining process is ended.

On the other hand, the position $H_{POS}$ is located in the central portion image area C, the boundaries of the film width direction end portions of an image recorded on the developed negative film 34 are not clear, and a change in density in an area outside the central portion image area C does not occur or slightly occurs. For example, an image recorded on the negative film in an extremely underexposure condition, as shown in FIG. 9C, an image whose background portion (edge portion of the image) has an extremely low density (FIG. 9A shows an image of a firework scene) is in this case. A result of accumulating density change values of each second measurement point string with respect to the image shown in FIG. 9A is shown in FIG. 9C. Therefore, it is understood that the position $H_{POS}$ of the second measurement point string at which the accumulated value of density change is maximum is located in the central portion image area C.

In this embodiment, in the above case, the flow is shifted from step 154 to step 156, determination of an image size according to the present invention is performed in steps subsequent to step 156. More specifically, in step 156, a density histogram is formed on the basis of a density value at each measurement point (for example, see FIG. 10). In next step 158, a threshold value in binarization is determined by using the density histogram.

When the threshold value is to be determined, a film base density value $D_B$ is calculated. As the base density value $D_B$, a density value having a maximum population in the density histogram in a predetermined range (range from a density value Da to a density value Db in FIG. 10). The range is determined by measuring the film base densities of various negative films in advance and by estimating the range in which a film base density value is present regardless of the type of a negative film. For the measurement points in the density measurement range, a total number n of measurement points each having a density value which is equal to or larger than the base density value $D_B$ is calculated. With reference to the maximum value of the density in the measurement range, a density value obtained when an accumulated number of the density values from the maximum value becomes a predetermined number smaller than the total number n (e.g., 0.9×n) can be used as a threshold value.

In step 158, the threshold value determined as described above is used to perform binarization for dividing the density measurement area into a non-image portion constituted by measurement points each having a density value smaller than the threshold value and an image portion constituted by measurement points each having a density value which is equal to or larger than the threshold value.

Figure 11A:
FIG. 11A shows a panorama-size image recorded on a negative film.
Figure 11B:
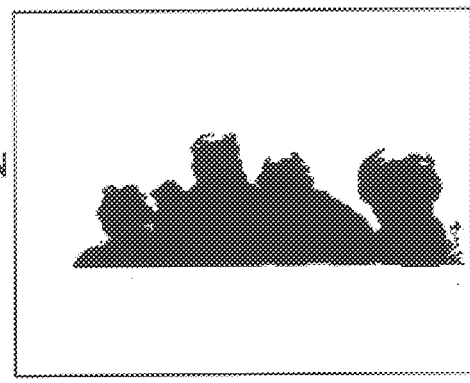
FIG. 11B shows a binary image obtained by binarizing the image in FIG. 11A.
Figure 11C:
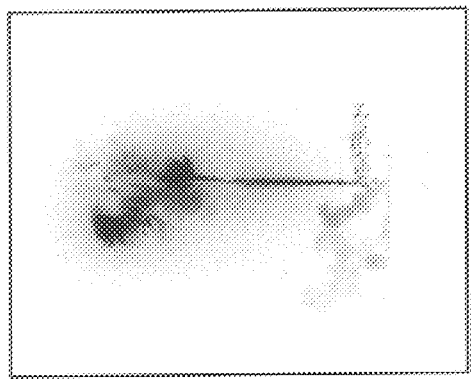
FIG. 11C shows a standard-size image recorded on a negative film.
Figure 11D:
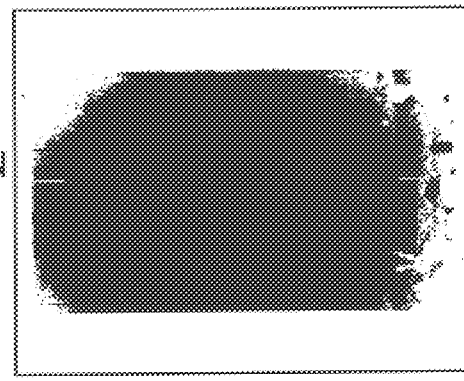
FIG. 11D shows a binary image obtained by binarizing the image in FIG. 11C.

With this binarization, a binary image shown in FIG. 11B is obtained from a panorama-size image shown in FIG. 11A, and a binary image shown in FIG. 11D is obtained from a standard-size image shown in FIG. 11C. Note that, in FIGS. 11B and 11D, an area classified as an image portion and an area classified as a non-image portion are indicated by black and white, respectively. The image shown in FIG. 11C is an image of a firework scene like the image shown in FIG. 9A. As shown in FIG. 11D, it is understood that a portion which almost coincides with an actual image recording range is extracted as an image portion by the binarization. Note that the processes in steps 156 and 158 correspond to the extraction means of the present invention.

In step 160, in each of the standard image present area F, the panorama edge present area P, and the central portion image area C, in area rate (image presence rate) of an image area extracted by the binarization is calculated. In next step 162, it is determined whether the image presence rate in the overall density measurement area (standard image present area F+panorama edge present area P+central portion image area C) is smaller than a predetermined value a. If YES in step 162, the area rate of the image portion is very low throughout the overall density measurement area, it is difficult to determine an image size. In this case, the flow is shifted to step 174 to determine the image size as a standard size, and the image size determining process is ended.

On the other hand, if NO in step 162, it is determined in step 164 whether the image presence rate in the standard image present area F is equal to or larger than a predetermined value b. If YES in step 164, the area rate of the image area outside the recording range of a panorama-size image is high. For this reason, the flow is shifted to step 174 to determine the image size as a standard size, and the image size determining process is ended. If NO in step 164, it is determined in step 166 whether an image present rate in the panorama edge present area P is equal to or larger than a predetermined value c. If YES in step 166, the image recorded on the developed negative film 34 is estimated to be a panorama-size image at high probability. For this reason, the flow is shifted to step 176 to determine the image size as a panorama size, and the image size determining process is ended.

If NO in step 166, as in a case wherein YES is determined in step 162, it is difficult to determine an image size. For this reason, it is determined in step 174 that the image is a standard size, and the image size determining process is ended. Note that steps 160 to 166 described above correspond to the determination means of the present invention.

In the above processes, with reference to the maximum value of a density in the measurement range, the density value at a measurement point at which an accumulated value from the maximum value of the density in the density histogram is a predetermined value is set as a threshold value. Therefore, a proper threshold value corresponding to a change in entire density of an image caused by an exposure amount in image recording can be set. When an image area is extracted by using the threshold value, an area approximate to an actual image recording range can be extracted as an image area even if a change in density in a boundary of the image recording range is very small.

In addition, a density measurement area is divided into a plurality or partial areas (standard image present area F, panorama edge present area P, and central portion image area C), and an image size is determined on the basis of the presence rate of an image area in each partial area. For this reason, determination of image size based on the distribution of the image area can be performed with a simple process. In addition, in an image in which fogging occurs outside an image recording range, a portion exposed by fogging is also extracted as an image area. However, the portion exposed by fogging generally has a small area. When the presence rate of the portion exposed by fogging, extracted as an image area, and being in outside the image recording range is equal to or smaller than a predetermined value, an image size can be accurately determined. Therefore, a panorama-size image in which fogging occurs outside the image recording range can be almost accurately determined as a panorama-size image.

When it is determined in step 154 that the position $H_{POS}$ is located in the panorama edge present area P, an image recorded on the developed negative film 34 has a panorama size at high probability. However, in a standard-size image in which a density change pattern (e.g., periodical stripe pattern or the like) having a predetermined length or more and parallel to the boundaries of the image is formed near a position (corresponding to a boundary of a panorama-size image, depending on the magnitude of the change in density at the boundary of an actual image, the position $H_{POS}$ may be located in the panorama edge present area P. For this reasons when the position $H_{POS}$ is located in the panorama edge present area P, the flow is shifted from step 54 to step 168.

In step 168, a plurality of measurement points which are present in a predetermined area A or a predetermined area B in the density measurement area are determined. For the density change values at the measurement point calculated in step 142, density change values, in directions (eight directions), of a plurality of measurement points in the predetermined area A or B are extracted. The range of the predetermined area A and the predetermined area B, as shown in FIG. 12, is assumed to be an area obtained by removing hatched areas shown in FIG. 12 from the range (range constituted by the standard image present area F and the panorama edge present area P) outside the image recording range of the panorama-size image.

Figure 12:
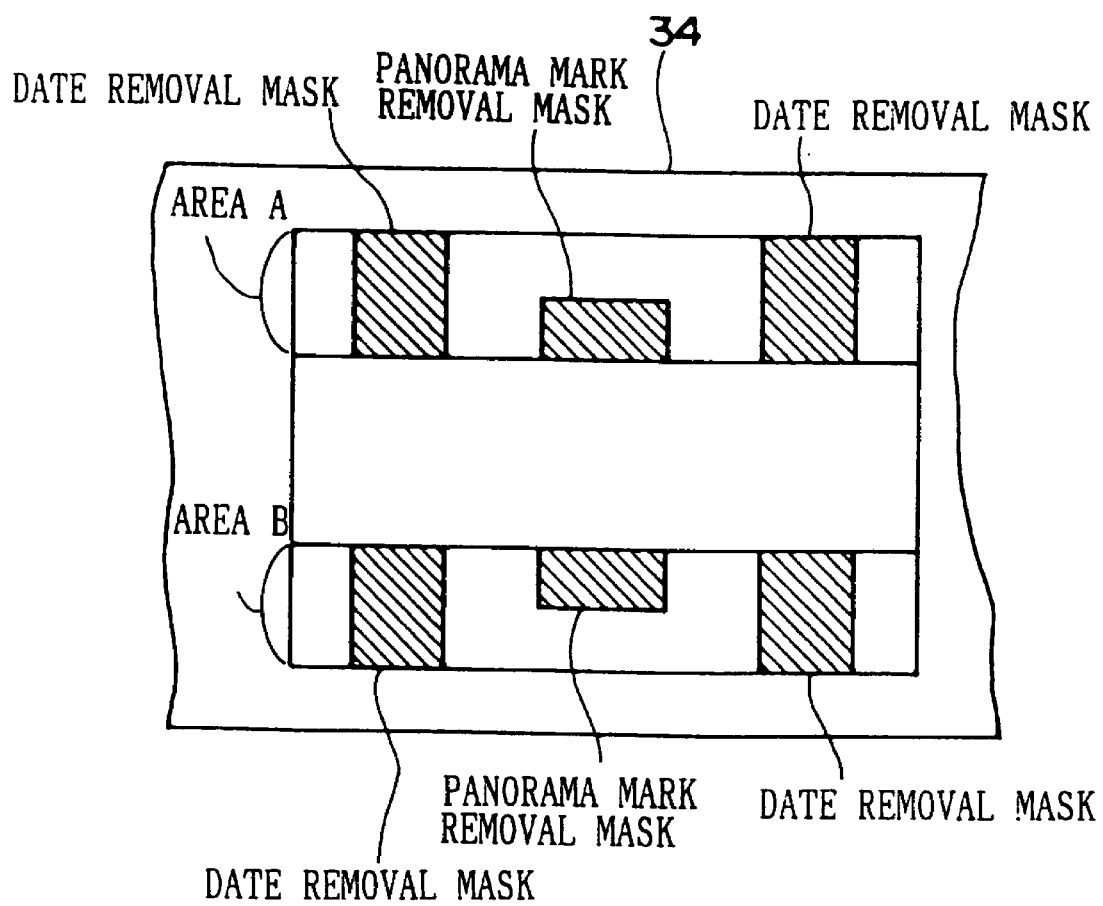
FIG. 12 is a plan view of a negative film showing areas A and B for calculating the variance and average value of a density change value.

Note that, in the hatched areas shown in FIG. 12, an area labeled "date removal mask" is an area in which a date may be recorded by a camera, depending on the type of the camera used for recording an image on the developed negative film 34, when a panorama-size image is recorded. An area labeled "panorama mark removal mask" in FIG. 12 is an area in which a mark indicating a panorama size may be recorded by a camera, depending on the type of the camera used for recording an image on the developed negative film 34, when a panorama-size image is recorded.

In step 170, the density change value extracted in step 168 is normalized according to equation (1) described below, average values and variances of measurement points which are present in the predetermined areas A and B are calculated by using the normalized density change value.

Equation 1

$$\text{normalized density change value} = \frac{\text{density change value which is not normalied}}{\text{maximum value of density change value}} \times 100 \quad (1)$$

The present inventor performed measurements of the densities at a large number of measurement points in the predetermined area A and B for a large number of standard-size images (including a standard-size image in which a density change pattern having a predetermined length and parallel to the boundaries of the image is formed near a position corresponding to a boundary of a panorama-size image) and for a large number of panorama-size images. An density change amount at each measurement point was calculated, and the variance and average value of the calculated density change amounts at the measurement points was calculated for each of the predetermined areas A and B. FIG. 13A shows a plotting of calculation results (variances and average values of density change amounts) with respect to a standard-size image, and FIG. 13B shows a plotting of calculation results with respect to a panorama-size image.

As is apparent from FIG. 13, in the panorama-size image, the variances and average values of density change amounts in the predetermined areas A and B are relatively small, the dots representing the calculation results are concentrated within a relatively small predetermined range on the graph in FIG. 13B. In contrast, in the standard-size image, the variances and average values of density change amounts in the predetermined areas A and B are often relatively large, and it is understood that the dots representing the calculation results are distributed in a large area on the graph in FIG. 13A. In the FIG. 13A showing the result with respect to the standard-size image, dots are present in the predetermined range corresponding to the results of the panorama-size image. However, the present inventor found that the results of the predetermined areas A and B for the same image are rarely present in the predetermined region at the same time.

With respect to a standard-size image in which a density change pattern having a predetermined length and parallel to the boundaries of the image is formed near a position corresponding to a boundary of a panorama-size image, the same tendency as described above is obtained for the following reason. That is, when the predetermined area is unexposed or is exposed by fogging, a change in density in the predetermined area and a change in density change amount are relatively small, but when an image in the predetermined area is exposed, a density and a density change amount in the predetermined area complicatedly change depending on the contents of the exposed image.

On the basis of the above, it is determined in step 172 whether the average values of density change values calculated with respect to the predetermined areas A and B are smaller than the predetermined value c and whether the variances of density change values are smaller than the predetermined value d. If YES in step 172, the flow is shifted to step 176 to determine the image size as a panorama size, and the image size determining process is ended. If NO in step 172, the flow is shifted to step 174 to determine the image size as a standard size, and the image size determining process is ended.

In the process shown in FIG. 3, when the positions of the boundaries of both ends of the image in the film longitudinal direction are determined in step 148 in FIG. 2, YES is determined in step 104, and the flow is shifted to step 116. On the basis of the positions of the boundaries of the image determined in step 148, it is determined in step 116 whether the image reaches an exposure position corresponding to the exposure stage 32. If YES in step 116, the flow returns to step 100 to continuously perform the feeding operation of the developed negative film 34 (when a density measurement area corresponding to another image corresponds to the photometric stage 54, the feeding operation of the developed negative film 34 is continuously performed while performing density measurement with respect to the density measurement area).

If YES in step 116, the feeding operation of the developed negative film 34 is stopped (thereby positioning the image at an exposure position), and the flow is shifted to step 118 to receive the determination result of an image size obtained by the image size determining process. In next step 120, the image positioned at the exposure position is subjected to a photometric operation by the photometer 50. In step 122, a printing magnification is determined on the basis of the received determination result of the image size, and exposure conditions for printing the positioned image on the printing paper 48 is calculated on the basis of the photometric value of a reference negative film stored in the control circuit 52 in advance, the photometric value input from the photometer 50, and the printing magnification. The lens 44 is switched depending on the determined printing magnification, and the size of the opening in the variable negative mask of the exposure stage 32 is changed depending on the determined result of the image size. In this manner, movement of the filters of the light-adjusting filter section 40 and the black shutter 46 is controlled such that the exposure conditions for the printing paper 48 correspond with the determined exposure conditions, thereby performing an exposure process.

In step 126, it is determined whether a printing process for all the images recorded on the developed negative film 34 is ended. If NO in step 126, the flow returns to step 100 to repeat the above processes. Therefore, at each time when density measurement for a density measurement area is completed, the image size determining process is started to determine the position and size of an image corresponding to the density measurement area. On the basis of the determination result, positioning of the image and switching operations of the lens 44 and the variable negative mask are performed, and the exposure conditions are determined, thereby printing the image of the negative film 34 on the printing paper 48.

If YES in step 126, the negative film 34 is fed to the trailing end in the feeding direction in step 128, and the process is ended.

In the above embodiment, the line sensor 62 is used, however, a two-dimensional image sensor such as a CCD or the like in which light-receiving elements are arranged in a matrix form may be used.

The differential filter shown in FIG. 3 is only an example. Various edge detection operators such as conventionally known Robinson, Prewitt, and Kirsch type can be applied.

In addition, when the positions of boundaries of both ends of the image in the film longitudinal direction are to be detected, if the accumulated value of density change is equal to or larger than a predetermined value at plural of first measurement point strings, the approximate position of the boundary is estimated on the basis of the position of the notch 34C. However, since images are generally recorded on the negative film 34 at predetermined intervals, the approximate position of the boundary may be estimated on the basis of the position of another image whose position is detected. An image recorded on the negative film 34 has a constant interval between the boundaries of both ends of the image in the film longitudinal direction regardless of the image size. By using this, the approximate positions of the boundaries may be estimated. In addition, in consideration of the changing characteristic of density values of a first measurement point string in which the accumulated value of density change is equal to or larger than a predetermined value, a pair of first measurement point strings which are estimated to correspond to the boundaries of both the end of the image in the film longitudinal direction may be selected.

In this embodiment, on the basis of a detection result from the notch sensor 66 and a feeding amount of the negative film 34 after the notch 34C is detected by the notch sensor 66, it is determined whether a density measurement area corresponds to a photometric position. However, the present invention cannot be limited to this arrangement. For example, a photometric value output from the line sensor 62 is monitored while the negative film 34 is fed, and, in a predetermined range in which the boundary of the density measurement area is present at high probability on the negative film, a position where a photometric value output from the line sensor 62 becomes maximum is specified. When the received photometric value is slightly smaller than the photometric value at the portion where the maximum photometric value is obtained (e.g., about 90 to 95%), it is determined that the boundary portion of the density measurement area corresponds to the line sensor 62. In a time period from when the boundary portion corresponds to the line sensor 62 to when the negative film 34 is fed by a length of the density measurement area along the longitudinal direction of the negative film 34, it may be determined that the density measurement area corresponds to the line sensor 62.

This is based on the fact that the position where the photometric value is maximum on the negative film 34 has a density lower than that of its peripheral portion and that position is an unexposed portion between a plurality of images recorded on the negative film 34 at high probability. Note that, when the image is present on the upstream of the image corresponding to the density measurement area in the feeding direction of the negative film 34, the position which is present on the upstream can be determined by the image size determining process at a high accuracy in advance. For this reason, with reference to the position of the image which is present on the upstream, the position of the predetermined range in which the boundary of the density measurement area is present at high probability can be fixed. In addition, even if the image is not present on the upstream of the image corresponding to the density measurement area in feeding direction of the negative film 34, a range subsequent to a position which is a predetermined distance from the leading end of the negative film 34 can be used as the predetermined range.

In this embodiment, a pre-process of determining the boundary of an image is performed before an image size determination, and image size determination by image extraction and by calculation of density distribution characteristics are performed in correspondence with the result of the pre-process. However, the image size determination by image extraction or the image size determination by calculation of density distribution characteristics may be performed immediately after densities are measured.

When a threshold value is to be set in this embodiment, the threshold value may be set with reference to the minimum value of the density, with reference to the minimum and maximum value of the density, or with reference to a density value which is larger than the density of the film base of the negative film by a predetermined value.

In this embodiment, although the base density of the negative film is calculated on the basis of a density histogram for each measurement point, the base density may be obtained in the following manner. Base densities of negative films are measured for each film type and stored in a storage means, the film type of each negative film is determined by reading a bar-code added to the corresponding negative film, a DX code added to a film case which contains the corresponding negative film, or the like, and the base density corresponding to the determined film type is read to be used.

In this embodiment, the variance and average value of density change values at measurement points in the areas A and B are compared with a predetermined value to determine an image size. However, an image size may be determined by only using the variances of density change values, the variance of densities, or the variance and average value of densities. In addition, the sum of density values in the areas A and B may also be used in place of the average value.

[Second Embodiment]

The second embodiment of the present invention will be described below. The same reference numerals as in the first embodiment denote the same parts in the second embodiment, and a description thereof will be omitted.

When the photographic film is exposed, dye is emitted from a coupler to form a color. For this reason, regardless of an exposure amount or the color of the film base, the color of an exposed part contains a color component different from that of the film base color. For this reason, the base density detection means for detecting a density value of each component color of the film base of the photographic film is arranged. A component color measurement means may resolve the densities at a large number of measurement points into component colors to measure the densities, and the extraction means may extract an area constituted as the image area by the measurement points having different film base colors on the basis of the density values of the component colors of the film base detected by the base density detection means and the density values of the component colors of the measurement points measured by the density measurement means. The measurement point having a color different from the film base color can be determined by comparing the densities at the measurement points measured by the density measurement means with the density value of the film base for each color components. Therefore, regardless of the exposure amount in image recording or the color of the film base, a proper area corresponding to the image portion can be extracted as the image area.

Note that when the base density detection means resolves the density of a predetermined portion, such as the leading or trailing end of a photographic film, on the photographic film which is known as an unexposed portion in advance, the density value of each component color of the film base can be detected.

Figure 14:
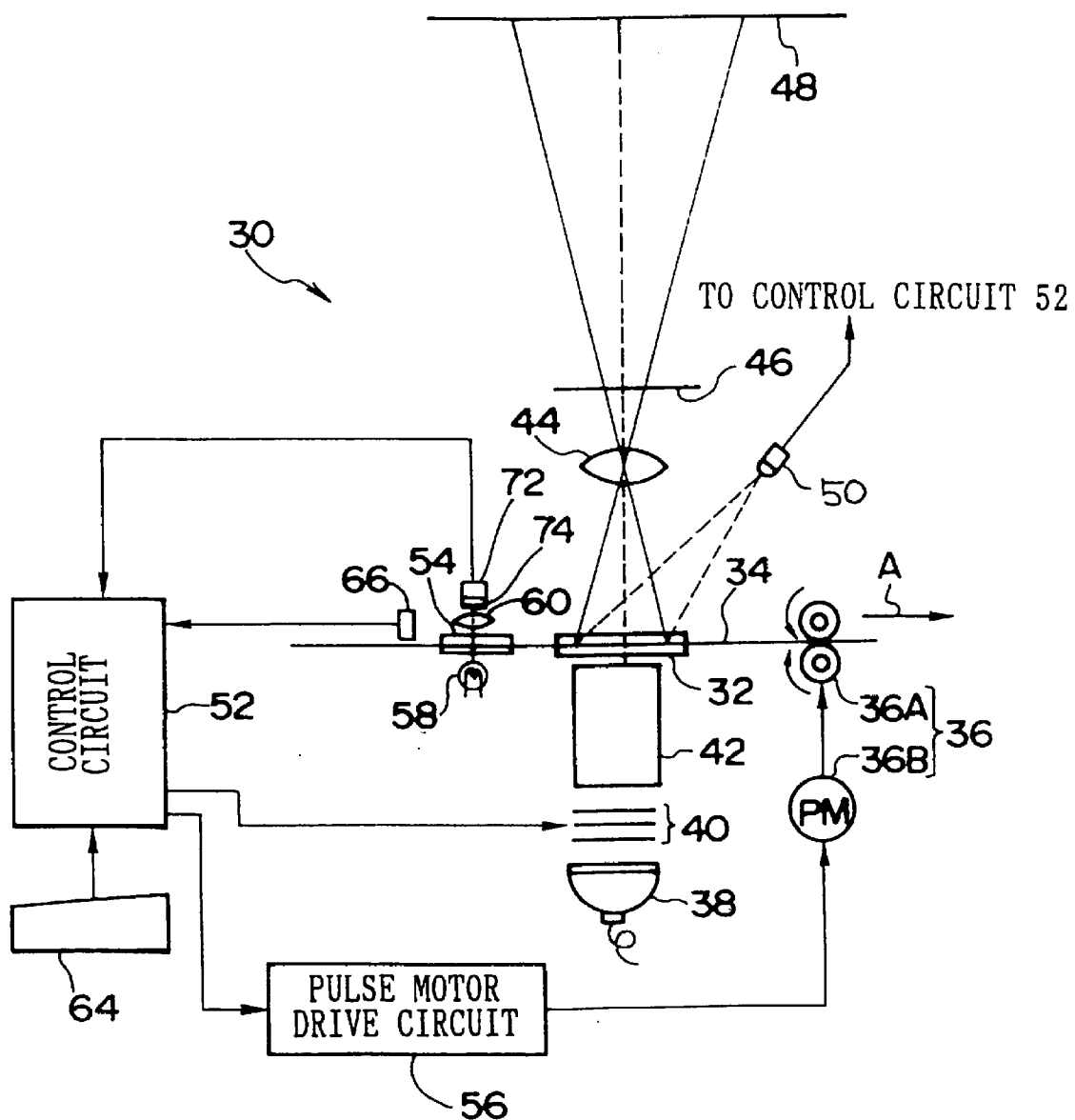
FIG. 14 is a schematic view showing the arrangement of a photograph printing apparatus according to the second embodiment.

FIG. 14 shows a photograph printing apparatus 70 according to the second embodiment of the present invention. In this photograph printing apparatus 70, in place of the line sensor 62 described in the first embodiment, a line sensor 72 in which a large number of light-receiving elements are arranged at a density higher (about 3 times) than that of the light-receiving elements of the line sensor 62. A color resolving filter 74 is arranged on the light-receiving surface of the line sensor 72. In the color resolving fitter 74, C, M, and Y filters are formed in the form of stripes in correspondence with the respective light-receiving elements of the line sensor 72. In this manner, light passing through each measurement point is resolved into R, G, and B color components, and the color components are received by the light-receiving elements.

Figure 15:
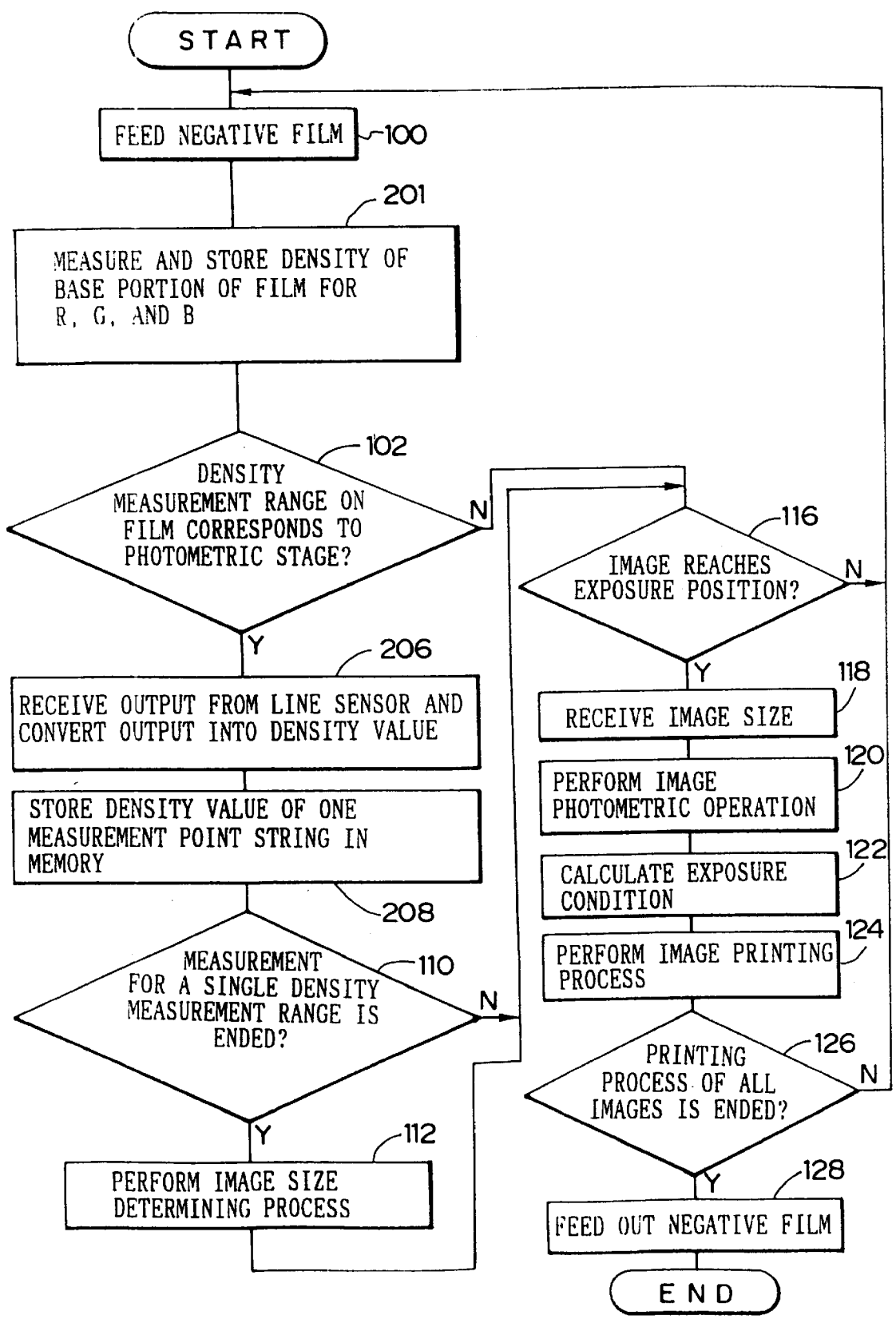
FIG. 15 is a flow chart for the measuring process of the negative film of the second embodiment and the printing step.

As the function of the second embodiment, only a different part between the flow chart in FIG. 15 and the flow chart in FIG. 3 described in the first embodiment will be described below with reference to the flow chart in FIG. 15. In the second embodiment, after the feeding operation of a negative film 34 is started in step 100, amounts of light passing through the film base of an unexposed portion (e.g., leading end portion) of the negative film 34 are measured by the line sensor 72 for R, G, and B in step 201, and the measurement results are converted into density values to be stored in a memory. Note that this process corresponds to the base density detection means of the present invention. When a density measurement range on the negative film 34 corresponds to a photometric stage 54, and YES is determined in step 102, an output from the line sensor 72 is received and converted into density values for R, G, and B to be stored in step 206.

Figure 16A:
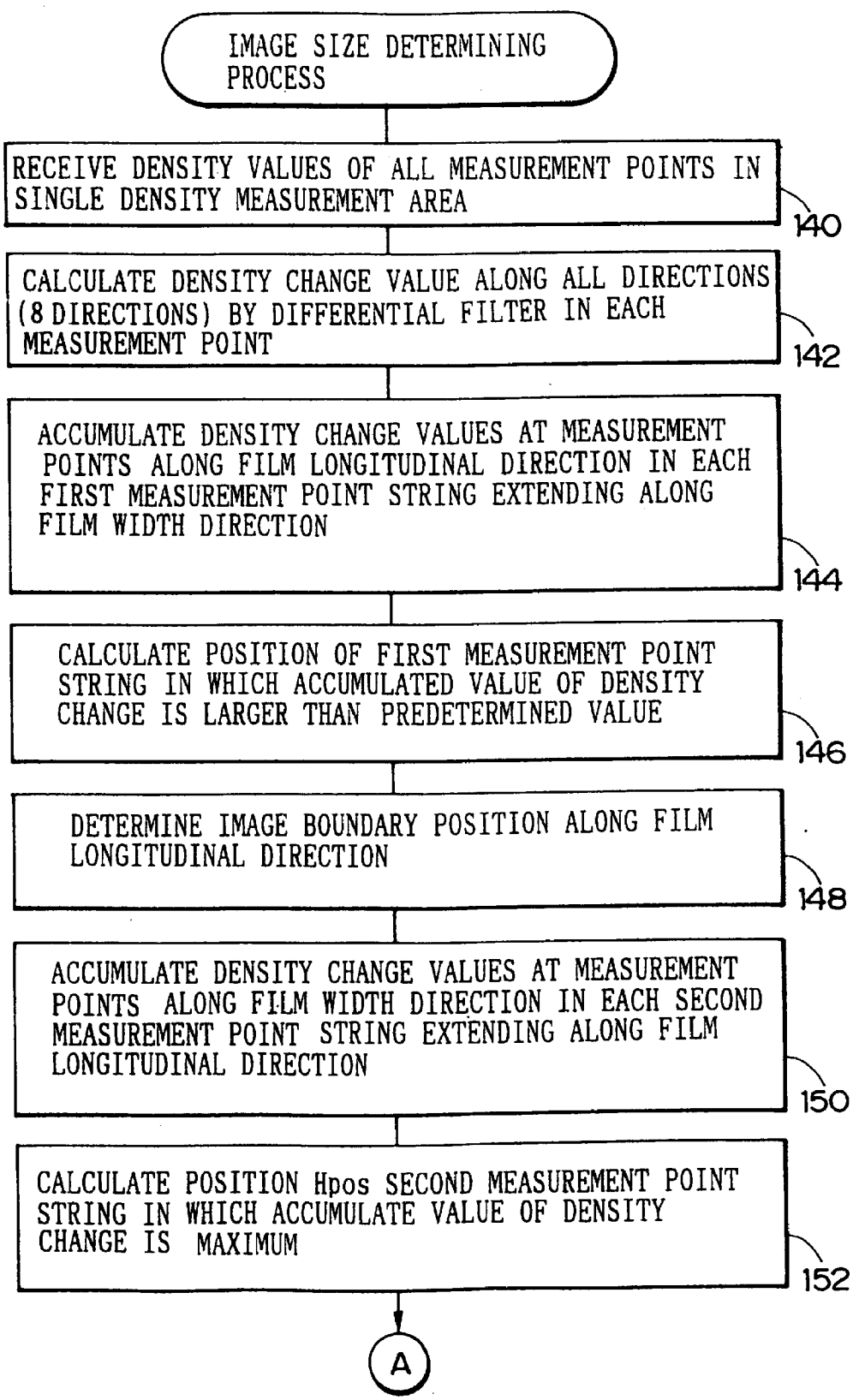

Only a different part between the flow chart in FIGS. 16A, 16B and the flow chart in FIGS. 4A, 4B described in the first embodiment will be described below with reference to the flow chart in FIGS. 16A and 16B. In the second embodiment, as described above, densities at measurement points are measured for R, G, and B. After the sums of density values of R, G, and B are calculated for each measurement points, the density change value at each measurement value is calculated. When it is determined in step 154 that a position $H_{POS}$ of a second measurement point string at which the accumulated value of density change is maximum is located in a central portion image area C, the flow is shifted to step 157 to receive the density values of R, G, and B of the film base of the negative film 34 which are stored in advance.

In step 159, the density values at measurement points are compared with the density value of the film base for R, G, and B, and a measurement point at which at least one of the density values of R, G, and B is different from the density value of the film base by a predetermined value or more. An area constituted by measurement points at which it is determined that a color is different from the film base is extracted as an image area. Note that step 159 corresponds to the extraction means of the present invention. In this manner, a proper area corresponding to an actual image recording range can be extracted as an image area regardless of an exposure amount in image recording to the negative film 34 or the color of a film base.

The processes subsequent to step 160 are the same as those of the first embodiment. As in the first embodiment, determination of an image size based on a distribution of an image area can be performed with a simple process, and a panorama-size image in which fogging occurs outside an image recording range can be almost accurately determined as a panorama-size image.

In this embodiment, the densities of R, G, and B of the film base of the negative film 34 are measured, the densities may be obtained in the following manner. That is, base densities of R, G, and B of negative films are measured for each film type and stored in a storage means in advance, the film type of each negative film is determined by reading a bar-code added to the corresponding negative film, a DX code added to a film case which contains the corresponding negative film, or the like, and the base densities corresponding to R, G, and B of the determined film type are read to be used. However, when a photographic film whose color property is changed due to aging may be processed, the above actual measurement of a density value of each component color is preferably performed because an accurate value can be obtained. In this embodiment, the same modification as in the first embodiment can be performed.

[Third Embodiment]

Figure 17A:
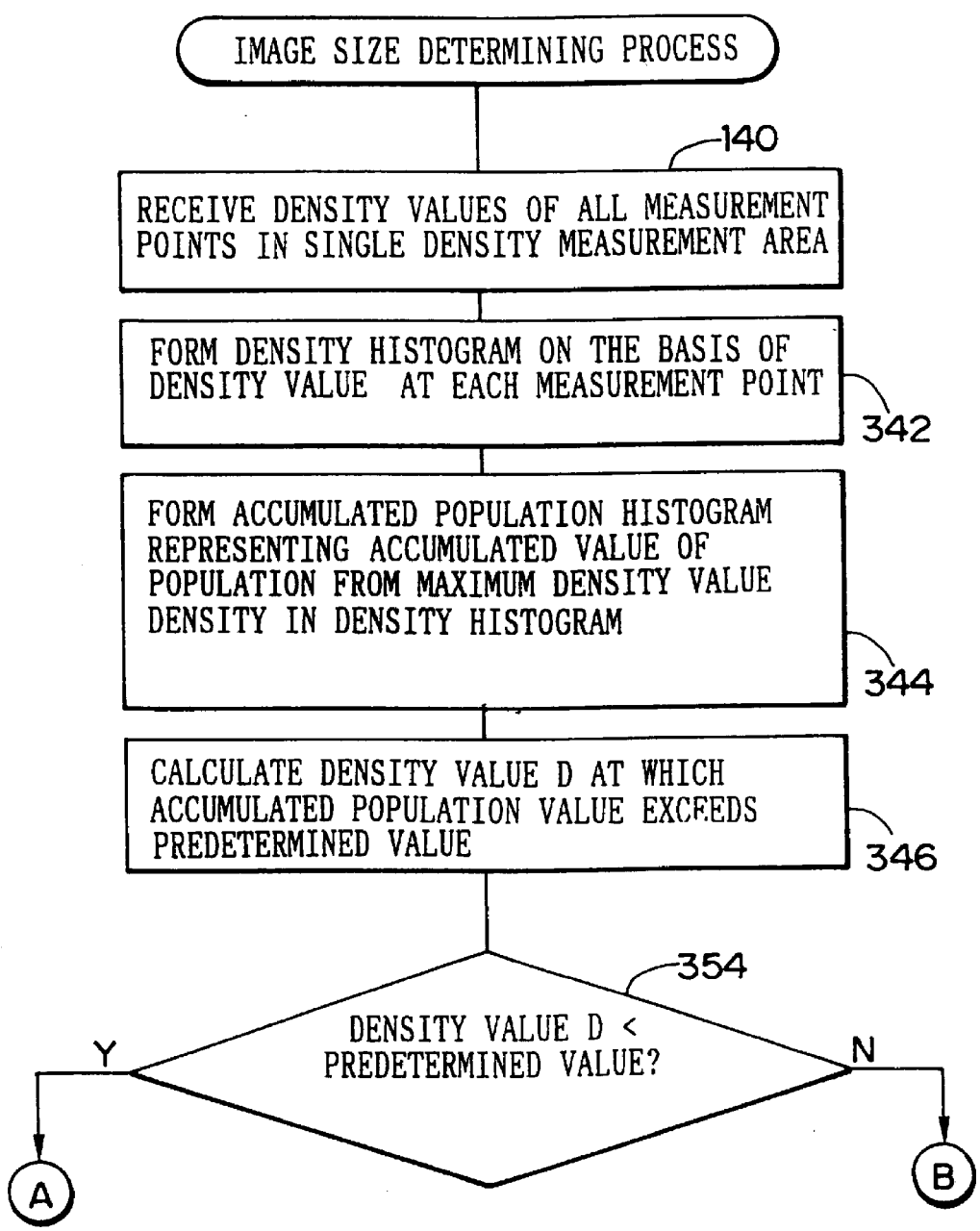
FIGS. 17A and 17B is a flow chart for the image size determining process of the third embodiment.
Figure 17B:
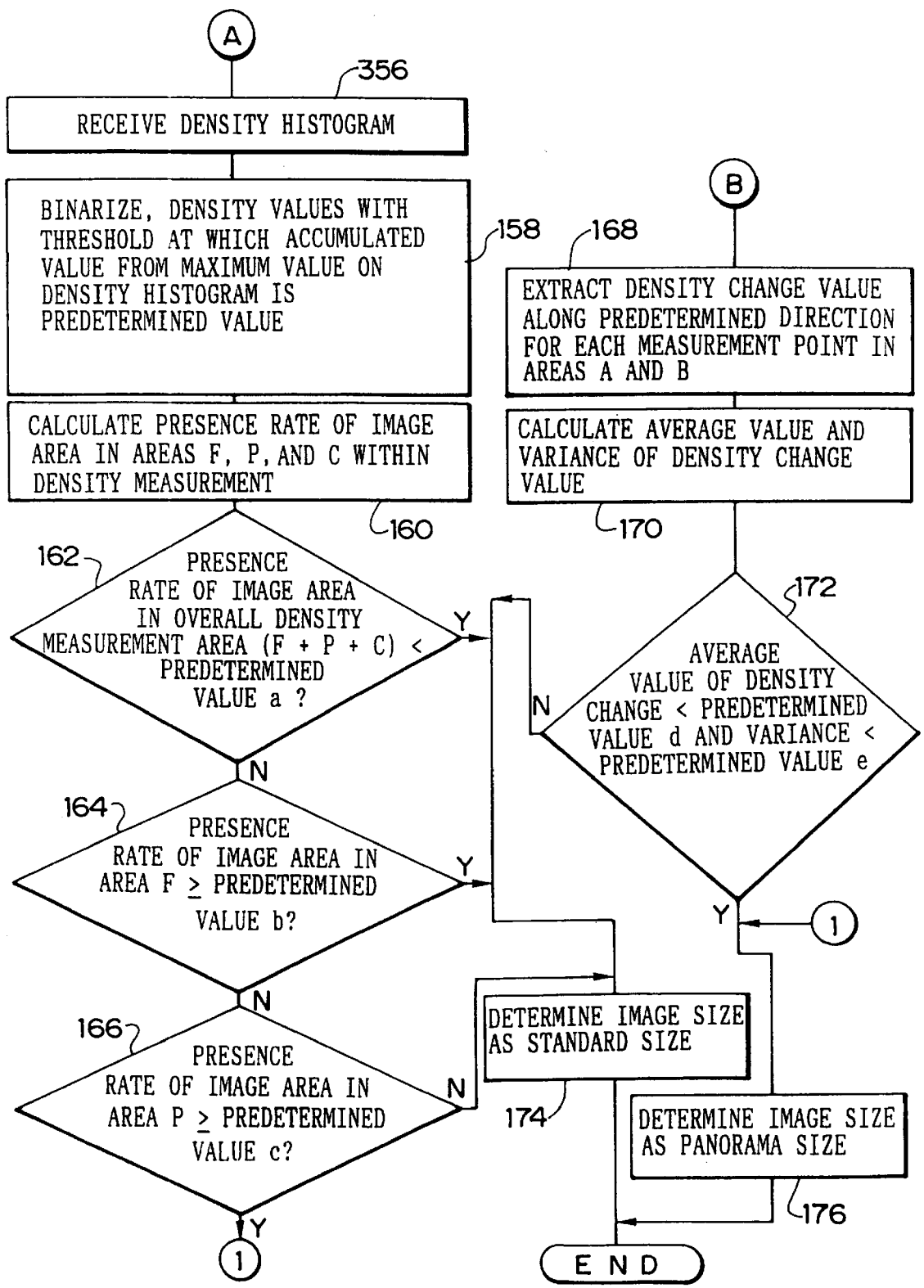

The third embodiment of the present invention will be described below. The apparatus arrangement and basic apparatus operation flow of the third embodiment are the same as those of the first embodiment. An image size determining process will be described below with reference to the flow chart in FIGS. 17A and 17B. Note that the same reference numerals as in the first embodiment denote the same parts in the third embodiment, and a description thereof will be omitted.

Figure 18A:
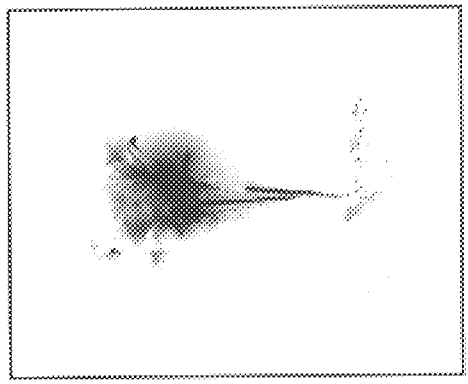
FIG. 18A is an image showing a standard-size image of a firework scene recorded on a negative film.
Figure 18B:
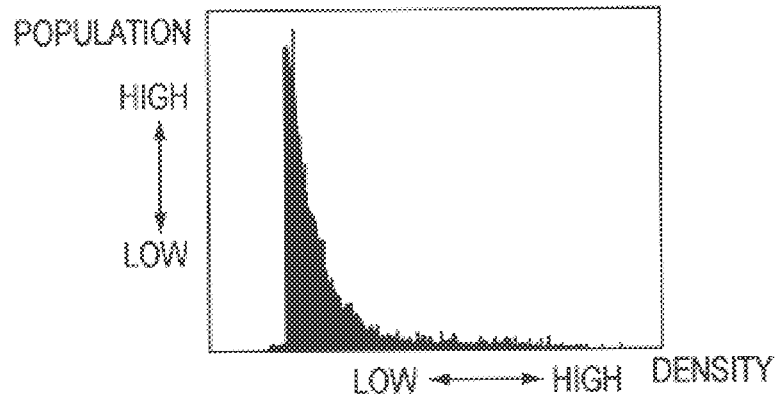
FIG. 18B shows a density histogram obtained from the image in FIG. 18A, and FIG. 18C, is a graph showing an accumulated population histogram obtained from a density histogram.
Figure 18C:
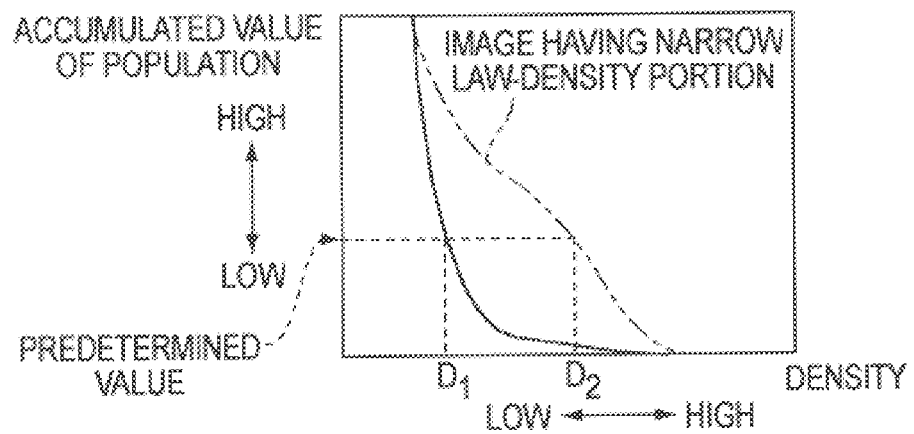

In step 140, densities at all the measurement points in a single density measurement area which are stored in a memory are received. In next step 342, a density histogram is formed on the basis of the density values at the measurement points stored in the memory. Note that FIG. 18B shows a density histogram formed for an image shown in FIG. 18A. In step 344, an accumulated population histogram representing an accumulated value of population from the maximum value of the density in the density histogram is formed. Referring to FIG. 18C, an accumulated population histogram formed on the basis of the density histogram shown in FIG. 18B is indicated by a solid line.

In step 346, in the accumulated histogram, a density value D at which the accumulated value of population exceeds a predetermined value is calculated. In step 354, it is determined whether the density value D is smaller than the predetermined value. Steps 342 to 354 correspond to the classification means of the present invention. For example, as shown in FIG. 18A, an image whose background portion (edge portion of the image) has an extremely low density (FIG. 18A shows an image of a firework scene), the number of measurement points at which densities are relatively low is large as shown in FIG. 18B, and an area rate of a low-density portion in the density measurement range is high. In the accumulated population histogram of such an image, as indicated by a solid curve in FIG. 18C, an increase in accumulated value is moderate on the high-density side from the maximum value of the density to the minimum value, and the accumulated value sharply increases on the low-density portion side.

When the accumulated population histogram changes as described above, the density value at which the accumulated value of population exceeds a predetermined value is set to be low (for example, see density $D_1$ in FIG. 18C), and YES is determined in step 154. An image in which the density value D is determined as a value smaller than the predetermined value has a high area rate of the low-density portion in the density measurement range as described above (the range of the low-density portion is wide). For this reason, a density in a boundary of the image is not clear, and a change in density in an area (area outside the central portion image area C shown in FIG. 8) outside the recording range of a panorama-size image in the recording range of standard-size image does not change or is low.

For this reason, if YES in step 354, the density histogram formed in step 342 is received in step 356, and the same process as in the first embodiment is performed in next step 158.

In an image recorded on the negative film 34 at an exposure amount which is equal to or higher than a standard exposure amount, the number of measurement points at which densities are relatively high is large. In particular, in a standard-size image recorded on the negative film 34 at an exposure amount which is equal to or larger than a standard exposure amount, compared with the image having the high area rate of the low-density portion in the density measurement range, as indicated by an imaginary line in FIG. 18C, the accumulated value of population increases at a relatively high increase rate from the maximum value of the density to the minimum value. In such a case, the density value at which the accumulated value of population exceeds the predetermined value becomes a large value (for example, see density $D_2$ in FIG. 18C), and NO is determined in step 354.

In an image of this type, a change in density in a boundary of the image is relatively large. For this reason, the image size can be determined by detecting the boundary of the image. In this determination, a standard-size image in which a density change pattern (e.g., periodical stripe pattern or the like) having a predetermined length or more and parallel to the boundaries of the image is formed near a position corresponding to a boundary of a panorama-size image may be erroneously determined as a panorama-size image. In addition, a panorama-size image in which a portion having a density equal to or higher than a predetermined density is formed by fogging outside the image recording range may be erroneously determined as a standard-size image. For this reason, if NO in step 354, the flow is shifted to step 168 to perform the same process as in the first embodiment.

As an alternative of this embodiment, the densities of R, G, and B at each measurement point are measured by the same apparatus arrangement as that in the second embodiment, and the same image area extracting process and image size determining process as those of the second embodiment can be performed.

In the third embodiment or its alternative, the same modification as in the first and second embodiments can be performed.

[Fourth Embodiment]

Figure 19A:
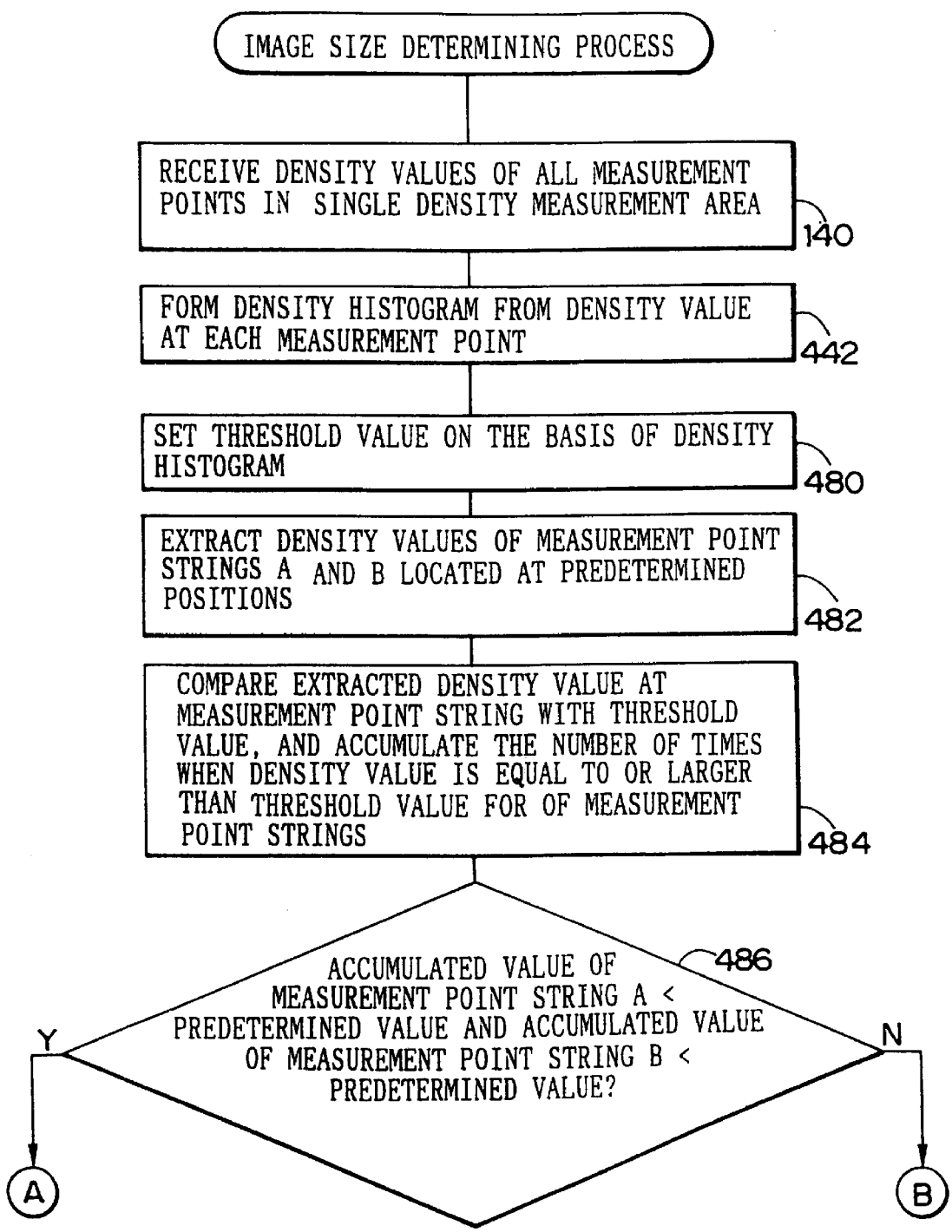
FIGS. 19A and 19B is a flow chart for the image size determining process in the fourth embodiment.
Figure 19B:
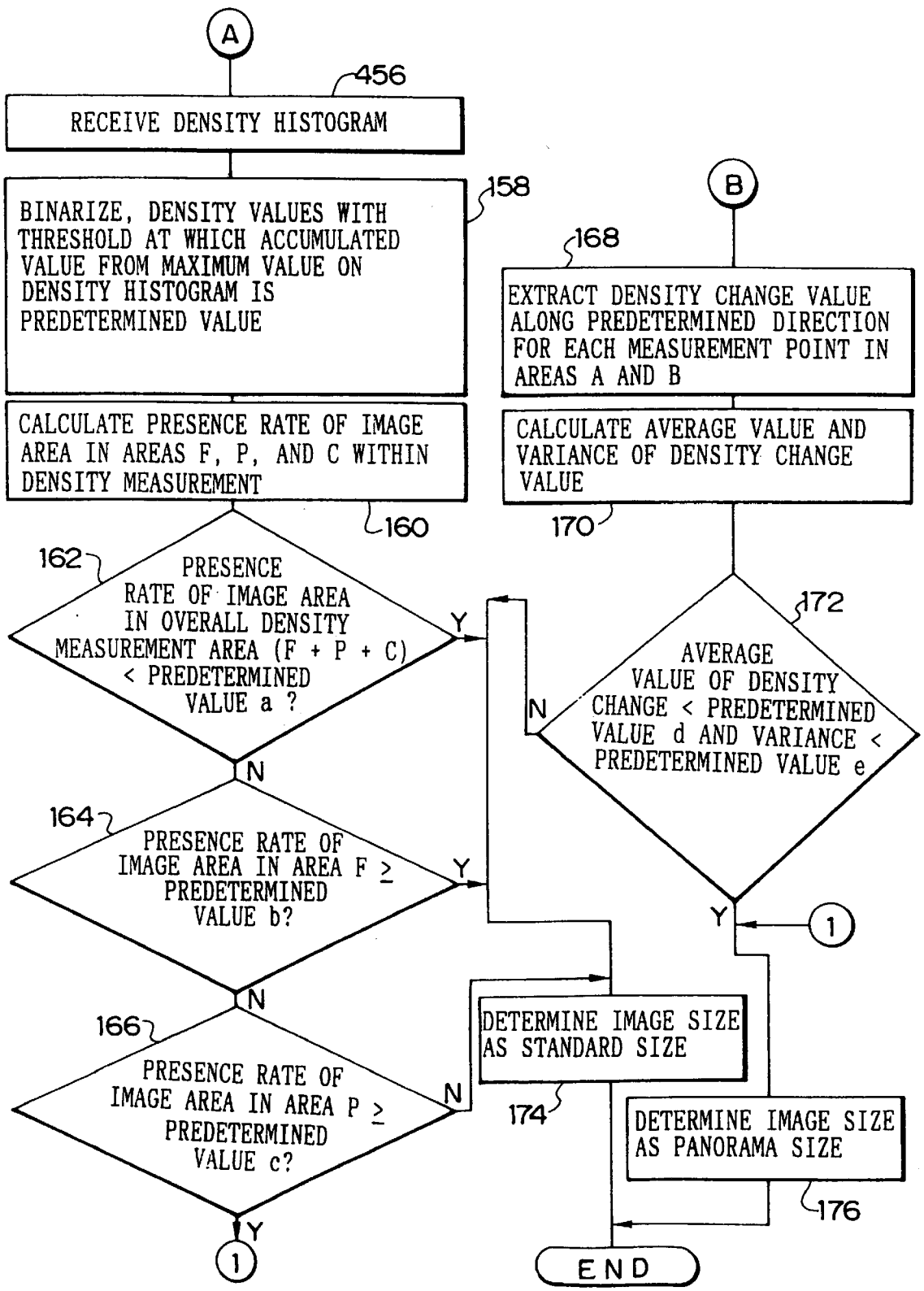

The fourth embodiment of the present invention will be described below. The apparatus arrangement and basic apparatus operation flow of the fourth embodiment are the same as those of the first embodiment. An image size determining process will be described below with reference to the flow chart in FIGS. 19A and 19B. Note that the same reference numerals as in the first embodiment denote the same parts in the fourth embodiment, and a description thereof will be omitted.

According to the fourth embodiment, a density value at each measurement point is received in step 140, and density histogram is formed on the basis of the density at each measurement point. Thereafter, in next step 480, on the basis of the density histogram, a density value at which the accumulated value of population from the maximum value of the density in the density histogram is set as a threshold value with reference to the maximum value of the density in the measurement area.

In step 482, density values in predetermined measurement point strings A and B located at fixed positions are extracted from the density values at the measurement points received in step 140. As shown in FIG. 20, the measurement point strings A and B are set to be located at positions corresponding to positions in the image recording range of a panorama-size image. In step 484, the density values at measurement points constituting the measurement point strings A and B are compared with the predetermined threshold value, and the numbers of times when the density values are equal to or larger than the threshold value (the number of measurement points in which density values are equal to or larger than the threshold value) are accumulated for the measurement point strings A and B. FIG. 20 shows results obtained by comparing the density values at the measurement points constituting the measurement point strings A and B with the threshold value when a standard-size image 34A and a panorama-size image 34B are recorded at an exposure amount equal to or larger than a standard exposure amount. In next step 486, it is determined whether the accumulated value of the measurement point string A and B are smaller than the predetermined value.

Note that steps 482 to 486 correspond to the classification means of the present invention. If YES in step 486, at least a plural of measurement points having densities lower than the threshold value are present outside the image recording range of a panorama-size image. For this reason, the range of a low-density portion having a relatively low density can be estimated to be wide in the density measurement range. Note that, as an image in which YES is determined in step 486, a panorama-size image recorded on the negative film 34 at an exposure amount equal to or larger than a standard exposure amount, an image recorded on the negative film 34 in an underexposure condition, or the like is used.

Therefore, if YES in step 486, the flow is shifted to step 456 to perform the same process as that in the first embodiment in the steps subsequent to step 456.

If NO in step 486, at least a plural of measurement points having densities equal to or higher than the threshold value are present outside the image recording range of a panorama-size image. For this reason, the range of a low-density portion having a relatively low density can be estimated to be narrow in the entire density measurement range. Note that, as an image in which NO is determined in step 486, a standard-size image recorded on the negative film 34 at an exposure amount equal to or larger than a standard exposure amount, a panorama-size image in which a portion having a density equal to or higher than the predetermined density is formed by fogging outside the image recording range, or the like is used. Therefore, if NO in step 486, the flow is shifted to step 168 to perform the same process as that in the first embodiment in the steps subsequent to step 186.

As an alternative of this embodiment, the densities of R, G, and B at each measurement point are measured by the same apparatus arrangement as that in the second embodiment, and the same image area extracting process and image size determining process as those of the second embodiment can be performed.

In the fourth embodiment or its alternative, the same modification as in the first and second embodiments can be performed.

[Fifth Embodiment]

Figure 21A:
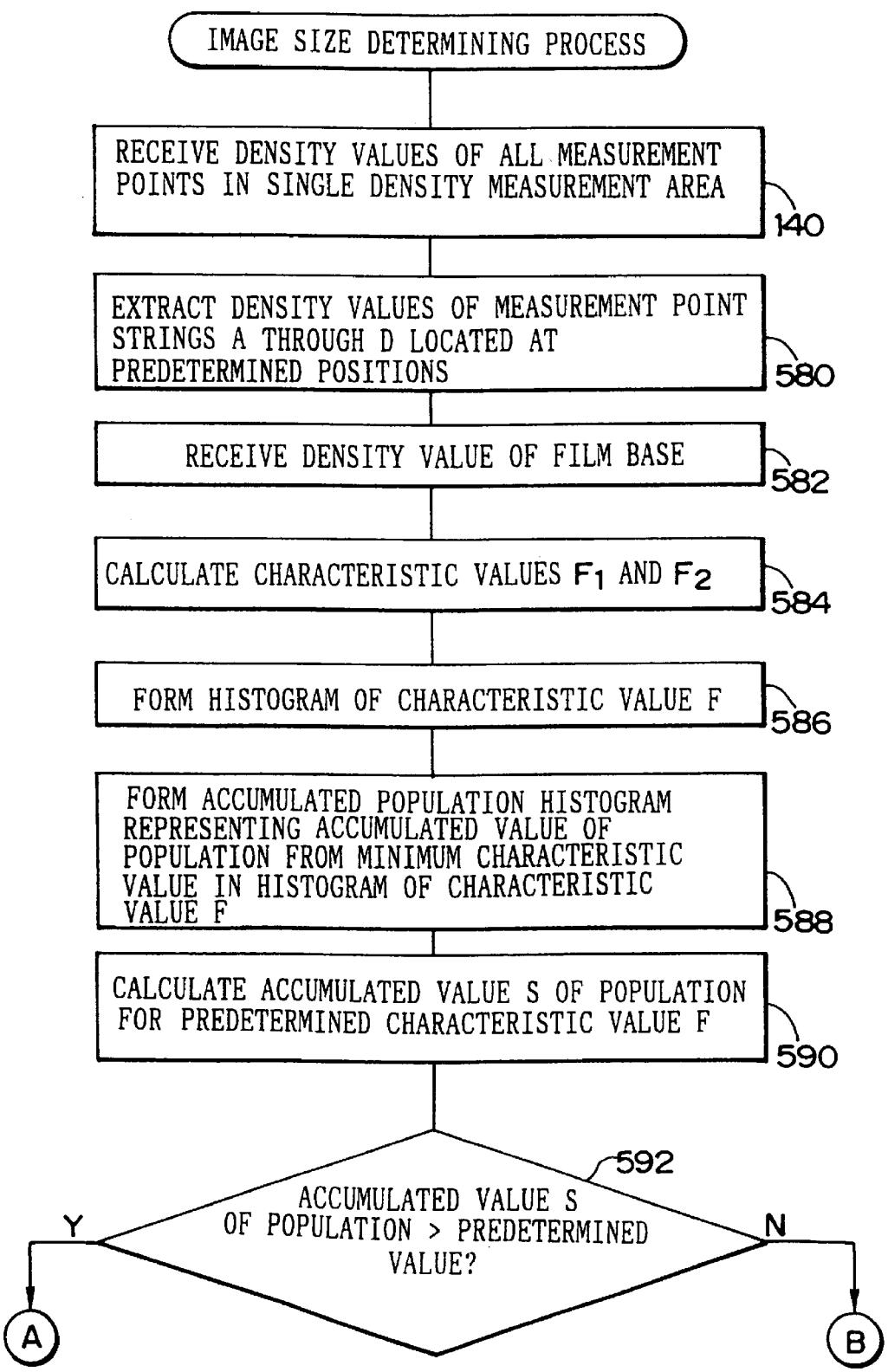
FIGS. 21A and 21B is a flow chart for an image size determining process according to the fifth embodiment.
Figure 21B:
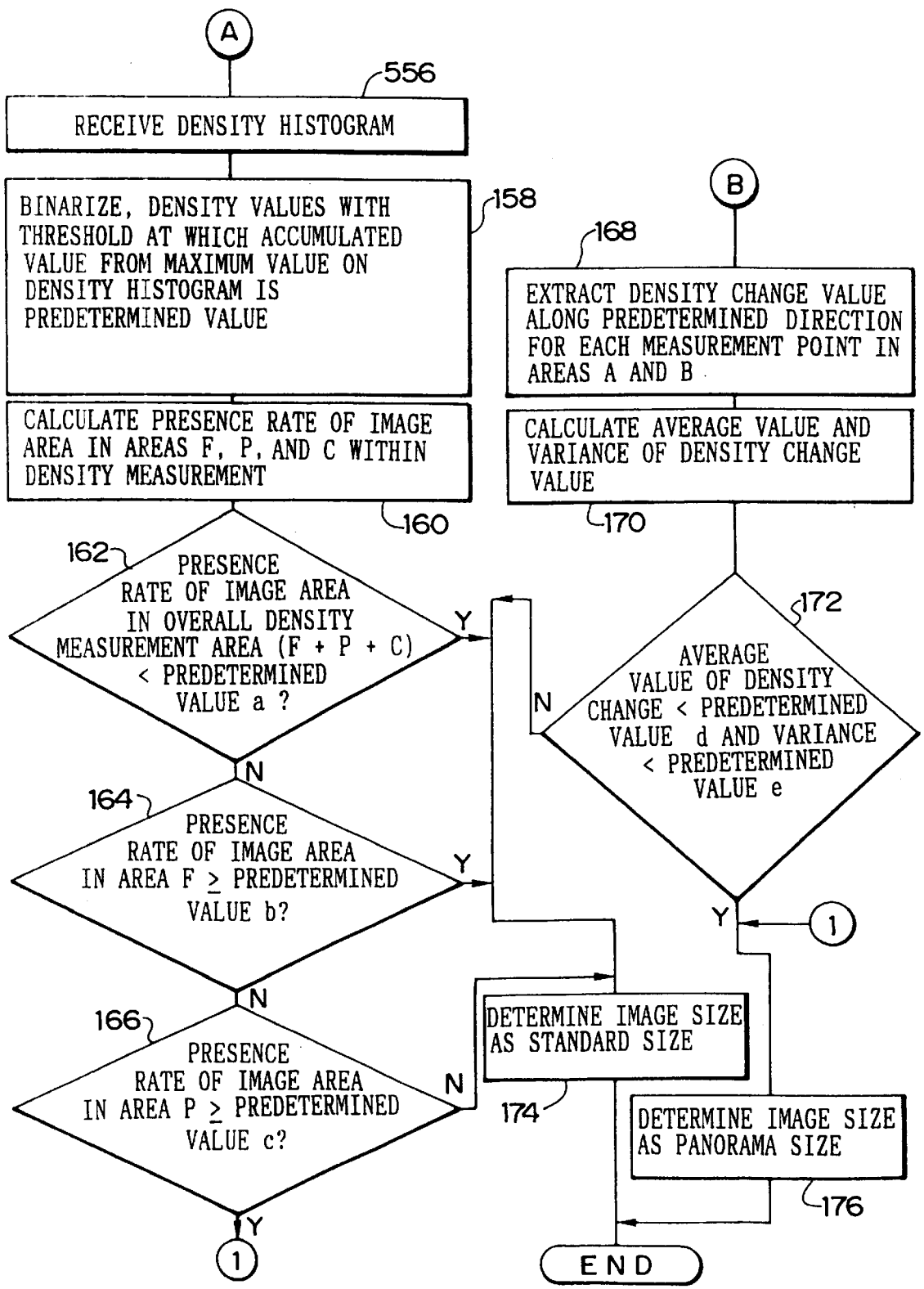

The fifth embodiment of the present invention will be described below. The apparatus arrangement and basic apparatus operation flow of the fourth embodiment are the same as those of the first embodiment. An image size determining process will be described below with reference to the flow chart in FIGS. 21A and 21B. Note that the same reference numerals as in the first embodiment denote the same parts in the fifth embodiment, and a description thereof will be omitted.

Figure 22A:
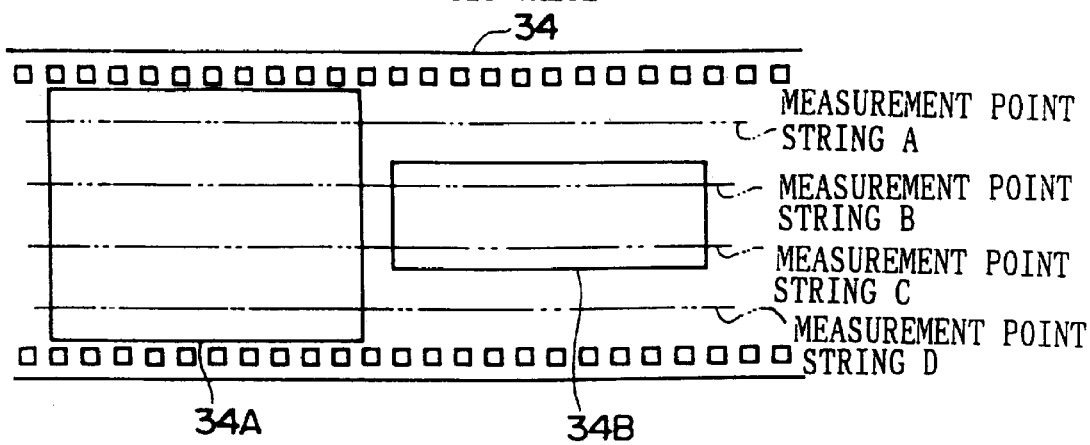
FIG. 22A is a plan view of a negative film showing the position of a measurement point string used to calculate a characteristic value F.

According to the fifth embodiment, after a density value at each measurement point is received in step 140, density values at measurement point strings A to D located at predetermined positions in step 580 are extracted. As shown in FIG. 22, the measurement point, strings A and D are in the recording range of a standard-size image, and are located at positions corresponding to positions outside the recording range of a panorama-size image, and the measurement point strings B and C are located at positions corresponding to positions in the recording range of the panorama-size image. In step 592, the density value of the film base of a negative film 34 which is measured and stored in advance is received.

Measurement of the density of the film base may be performed when the negative film 34 may be set in the photograph printing apparatus 30, or the density of the film base may be obtained by the following manner. That is, the densities of film bases are measured and stored for each type of negative films, each film type is detected by reading a bar-code added to the negative film 34, and a density value corresponding to the detected film type is received.

In next step 584, on the basis of the density value of the measurement point strings A to D extracted in step 580 and the density value of the film base of the negative film 34 received in step 582, characteristic values $F_1$ and $F_2$ at each measurement point of the measurement point strings A and D are calculated according to equation (2) described below.

$$F_1 = \frac{D_Z - D_A}{D_Z - D_B} \times 100 \qquad (2)$$

$$F_2 = \frac{D_Z - D_D}{D_Z - D_C} \times 100$$

Note that, in equation (2), $D_A$ to $D_D$ represent the densities at the measurement points of the measurement point strings A to D, $D_Z$ represents a density value of a film base. The characteristic values $F_1$ and $F_2$ represent the ratio of densities at the measurement points of the measurement point string A with respect to the measurement points of the measurement point string B and the ratio of densities at the measurement points of the measurement point string D with respect to the measurement points of the measurement point string C, respectively. As degree of image presence in a portion outside the image recording range with respect to the portion in the image recording range of the panorama-size image decreases, a characteristic value F becomes small.

Figure 22B:
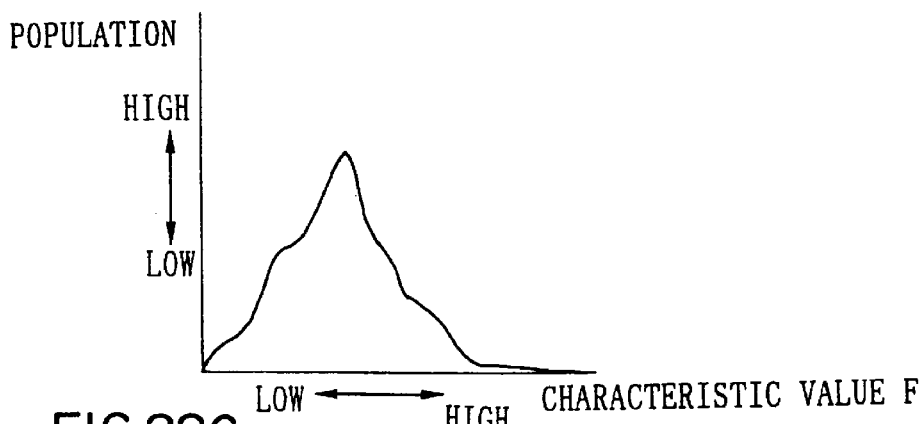
FIG. 22B is a graph showing a histogram of the characteristic value F.
Figure 22C:
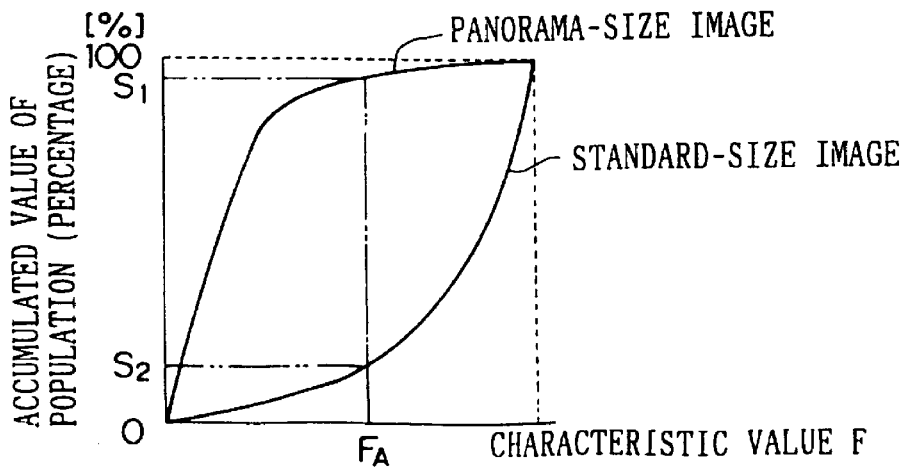
FIG. 22C is a graph showing an accumulated population histogram of the characteristic value F.

In step 586, on the basis of a large number of characteristic values $F_1$ and $F_2$ calculated in step 586, a histogram of the characteristic value F shown in FIG. 22B is formed. In next step 588, on the basis of the formed histogram of the characteristic value F, an accumulated population histogram representing an accumulated value of population from the minimum value of the characteristic value F. FIG. 22C shows accumulated population histograms (the accumulated value of population of the characteristic value F is expressed by percentage in FIG. 22C) obtained for a standard-size and a panorama-size image. In step 590, an accumulated value S of population when the characteristic value is a predetermined value is calculated in the accumulated population histogram. In next step 592, it is determined whether the calculated accumulated value S of population is larger than a predetermined value.

Note that steps 580 to 592 correspond to the classification means of the present invention. If YES in step 592, it can be determined that the difference between the density of an area outside the panorama-size image and the density of the area in the recording range of the panorama-size image is large. As an image in which YES is determined in step 592, a panorama-size image recorded on the negative film 34 at an exposure amount equal to or larger than a standard exposure amount, an image recorded on the negative film 34 in an underexposure condition, or the like is used.

More specifically, in a panorama-size image recorded on the negative film 34 it an exposure amount equal to or larger than a standard exposure amount, a degree of image presence of an area outside the image recording range is lower than that of an area in the image recording range. For this reason, on the accumulated histogram of the characteristic value F, the peak is in the range in which the characteristic value F is relatively small. On the accumulated population histogram, as shown in FIG. 22C, the accumulated value of population sharply increases in the range in which the characteristic value F is relatively small. For this reason, when it is assumed that the predetermined value in step 590 is a predetermined value $F_A$ shown in FIG. 22C, the accumulated value of population becomes $S_i$ shown in FIG. 22C to be a relatively large value. This is also performed to an image (image recorded on the negative film 34 in an underexposure condition) in which the main portion having a relatively high density is present in a panorama-size image recording range, and the densities of portions other than the main portion are low.

For this reason, when the accumulated value S of population is larger than the predetermined value, YES is determined in step 592, and the flow is shifted to step 556. The same process as that in the first embodiment is executed in the steps subsequent to step 556.

If YES in step 592, it can be determined that the difference between the density of an area outside the panorama-size image recording range and the density of the area in the recording range of the panorama-size image is small. As an image in which NO is determined in step 592, a standard-size image recorded on the negative film 34 at an exposure amount equal to or larger than a standard exposure amount, a panorama-size image in which a high-density portion is present outside the recording range of the panorama-size image by fogging, or the like is used.

More specifically, in a standard-size image recorded on the negative film 34 at an exposure amount equal to or larger than a standard exposure amount, a portion having a relatively high density is present in an area outside of the recording range of the panorama-size image, and a degree of image presence of the area outside the image recording range is lower than that of an area in the image recording range in the panorama-size image. For this reason, on the accumulated histogram of the characteristic value F, the peak is in the range in which the characteristic value F is relatively large. A change in accumulated value of population on the accumulated population histogram, as shown in FIG. 22C, the accumulated value of population gradually increases with an increase in characteristic value F. For this reason, when it is assumed that the predetermined value in step 590 is a predetermined value $F_A$ shown in FIG. 22C, the accumulated value of population becomes $S_2$ shown in FIG. 22C to be a relatively small value. This is also performed to a panorama-size image in which a high-density portion is present outside the recording range of the panorama-size image by fogging or the like.

For this reason, when the accumulated value S of population is equal to or smaller than the predetermined value, YES is determined in step 592, and the flow is shifted to step 168. The same process as that in the first embodiment is executed in the steps subsequent to step 168.

As an alternative of this embodiment, the densities of R, G, and B at each measurement point are measured by the same apparatus arrangement as that in the second embodiment, and the same image area extracting process and image size determining process as those of the second embodiment can be performed.

In the fifth embodiment or its alternative, the same modification as in the first and second embodiments can be performed.

As has been described in the above embodiments, according to the present invention, the size of an image recorded on a photographic film can be identified at an accuracy higher than that of prior art.

In each or the above embodiments, as a size which has a longitudinal direction dimension equal to that of the standard size and an aspect ratio smaller than that of the standard size, a panorama size is exemplified. The present invention is not limited to this size, and the present invention can also be applied to a case wherein an image having another size such as a size having an aspect ratio different from that of the panorama size is recorded. The present invention can also be applied to determination of three different image sizes respectively having different aspect ratios.

In addition, in each of the above embodiments, the present invention is applied to the photograph printing apparatus 30. However, the present invention can also be applied to a photograph processing apparatus for performing another step in the photograph processing steps.

In each or the above embodiments, a negative film is exemplified as a photographic film. The film is not limited to the negative film, and the present invention can be also applied to an image recorded on another photographic film such as universal film. In addition, the above describes a case wherein a plurality or images are recorded on a long belt-like film along the film longitudinal direction. However, the present invention can also be applied to a case wherein a plurality of images are recorded on a sheet-like film in a matrix form.

What is claimed is:

1. An image size identification apparatus comprising:
   density measurement means for measuring densities at a plurality of measurement points in a measurement area including an image recording range on a photographic film on which an image is recorded;
   extraction means for extracting an image area estimated to correspond to an image portion from the measurement area on the basis of the densities at the measurement points measured by the density measurement means; and
   determination means for determining an image size on the basis of a distribution of the image area extracted by the extraction means in the measurement area.

2. An apparatus according to claim 1, wherein said extraction means sets the threshold value of a density with reference to at least one of the minimum value and the maximum value of a density at measurement points to extract an area constituted by measurement points having densities which are equal to or larger than the threshold value as the image area.

3. An apparatus according to claim 1, wherein said determination means calculates a presence rate of the image area in each of the plurality of partial area obtained by dividing the measurement area as a distribution of the image area, and determines the size of the image on the basis of the calculated presence rate.

4. An apparatus according to claim 1, further comprising base density detection means for detecting a density value of each component color of the film base of the photographic film, wherein said density measurement means resolves the densities at a plurality of measurement points in the measurement area into component colors to measure the densities of each component color, and said extraction means extracts an area constituted by the measurement points having different film base colors as the image area on the basis of the density values of the component colors of the film base detected by said base density detection means and the density values of the component colors of the measurement points measured by said density measurement means.

5. An image size identification method comprising the steps of:
   measuring densities at a plurality of measurement points in a measurement area including an image recording range on a photographic film on which an image is recorded;
   extracting an image area estimated to correspond to an image portion from the measurement area on the basis of the densities at the measurement points measured by the density measurement means; and
   determining an image size on the basis of a distribution of the image area extracted by the extraction means in the measurement area.

6. A method according to claim 5, wherein said extracting step sets the threshold value of a density with reference to at least one of the minimum value and the maximum value of a density at measurement points to extract an area constituted by measurement points having densities which are equal to or larger than the threshold value as the image area.

7. A method according to claim 5, wherein said determining step calculates a presence rate of the image area in each of the plurality of partial area obtained by dividing the measurement area as a distribution of the image area, and determines the size of the image on the basis of the calculated presence rate.

8. A method according to claim 5, further comprising the step of detecting a density value of each component color of the film base of the photographic film, wherein said measuring step resolves the densities at a plurality of measurement points in the measurement area into component colors to measure the densities of each component color, and said extracting step extracts an area constituted by the measurement points having different film base colors as the image area on the basis of the density values of the component colors of the film base detected by said detecting step and the density values of the component colors of the measurement points measured by said measuring step.

9. An image size identification apparatus comprising:
density measurement means for measuring, in a photographic film on which an image is recorded, a density at a position in a determination area including a predetermined area which is in an image recording range when the image has a predetermined image size and which is outside the image recording range when the image has another image size different from the predetermined image size;
calculation means for calculating the degree of dispersion of a density at each position in the determination area or the degree of dispersion of a density change amount at each position on the basis of the density at each position in the determination area measured by the density measurement means, and determination means for determining the image size on the basis of the degree of dispersion of the densities or density change amounts calculated by the calculation means.

10. An apparatus according to claim 9, wherein said calculation means calculates the average value of the densities or density change amounts at each position in the determination area, and the determination means determines the image size in consideration of the average value of the densities or density change amounts calculated by said calculation means.

11. An image size identification method comprising the steps of:
measuring, in a photographic film on which an image is recorded, a density at a position in a determination area including a predetermined area which is in an image recording range when the image has a predetermined image size and which is outside the image recording range when the image has another image size different from the predetermined image size;
calculating the degree of dispersion of a density at each position in the determination area or the degree of dispersion of a density charge amount at each position on the basis or the measured density at each position in the determination area; and
determining the image size on the basis of the calculated degree of dispersion of the densities or density change amounts.

12. A method according to claim 11, further comprising the step of calculating the average value of the densities or density change amounts at each position in the determination area, wherein the determining step determines the image size in consideration of the calculated average value of the densities or density change amounts.

13. An image size identification apparatus comprising:
density measurement means for measuring densities at a plurality of positions in a measurement area including an image recording range on a photographic film on which an image is recorded;
classification means for classifying, on the basis of the densities at the plurality of positions measured by the density measurement means, the image recorded on the photographic film into an image in which the range of a portion having a density lower than a predetermined value is large in the measurement area or an image in which the range of the tow density portion is narrow;
extraction means for extracting an image area estimated to correspond to an image portion from the measurement area in the image classified as an image having a wide low-density portion by the classification means on the basis of the densities at the large number of measurement points;
first determination means for determining an image size on the basis of a distribution, in the measurement area, of the image area extracted by the extraction means;
calculation means for calculating, in the image classified as the image having a narrow low-density portion by the classification means, on the basis of a density at each position in a determination area including a predetermined area on the photographic film which is in an image recording range when the image size is a first image size and which is outside the image recording range when the image size is a second image size different from the first image size, the degree of dispersion of densities or density change values at each position in the determination area; and
second determination means for determining the image size on the basis of the degree of dispersion of the density and density change amount calculated by the calculation means.

14. An image size identification apparatus comprising:
density measurement means for measuring densities at a plurality of positions in a measurement area including an image recording range on a photographic film on which an image is recorded;
classification means for classifying, on the basis of the densities at the plurality of positions measured by the density measurement means, images recorded on the photographic film into an image in which the difference between a density in a first predetermined area on the photographic film which is in an image recording range when an image size is a first image size and which is outside the image recording range when the image size is a second image size different from the first image size and at density in a second predetermined area on the photographic film which is in the image recording range when the image size is any size is larger than a predetermined value, or an image in which the difference is smaller than the predetermined value;
extraction means for extracting an image area estimated to correspond to an image portion from the measurement are in the image classified as an image in which the difference is large by the classification means on the basis of the densities at the plurality of measurement points;

first determination means for determining an image size on the basis of a distribution, in the measurement area, of the image area extracted by the extraction means;

calculation means for calculating, in the image classified as the image in which the difference is small by the classification means, on the basis of a density at each position in the determination area including the first predetermined area, the degree of dispersion of densities or density change values at each position in the determination area; and second determination means for determining the image size on the basis of the degree of dispersion of the density and density change amount calculated by the calculation means.

15. An image size identification method comprising the steps of:

measuring densities at a plurality of positions in a measurement area including an image recording range on a photographic film on which an image is recorded;

classifying, on the basis of the measured densities at the plurality of measurement positions, the image recorded on the photographic film into an image in which the range of a portion having a density lower than a predetermined value is wide in the measurement area or an image in which the range of the low density portion is narrow;

extracting an image area estimated to correspond to an image portion from the measurement area in the image classified as an image having a wide low-density portion on the basis of the densities at the plurality of measurement points and determining an image size on the basis of a distribution, in the measurement area, of the extracted image area; and calculating, in the image classified as the image having a narrow low-density portion, on the basis of a density at each position in a determination area including a predetermined area on the photographic film which is in an image recording range when the image size is a first image size and which is outside the image recording range when the image size is a second image size different from the first image size, the degree of dispersion of densities or density change values at each position in the determination area; and determining the image size on the basis of the calculated degree of dispersion of the density and density change amount.

16. An image size identification method comprising the steps of:

measuring densities at a plurality of positions in a measurement area including an image recording range on a photographic film on which an image is recorded;

classifying, on the basis of the measured densities at the plurality of positions, images recorded on the photographic film into an image in which the difference between a density in a first predetermined area on the photographic film which is in an image recording range when an image size is a first image size and which is outside the image recording range when the image size is a second image size different from the first image size and a density in a second predetermined area on the photographic film which is in the image recording range when the image size is any size is larger than a predetermined value, or an image in which the difference is smaller than the predetermined value;

extracting an image area estimated to correspond to an image portion from the measurement area in the image classified as an image in which the difference is large on the basis of the densities at the large number of measurement points, and determining an image size on the basis of a distribution, in the measurement area, of the extracted image area; and calculating, in the image classified as the image in which the difference is small, on the basis of a density at each position in the determination area including the first predetermined area, the degree of dispersion of densities or density change values at each position in the determination area, and determining the image size on the basis of the calculated degree of dispersion of the density and density change amount.

17. An apparatus according to claim 3, wherein at least one of said plurality of partial area includes an area which is in an image recording range when the image has a first image size and which is outside the image recording range when the image has a second image size different from the first image size.

18. A method according to claim 7, wherein at least one of said plurality of partial area includes an area which is in an image recording range when the image has a first image size and which is outside the image recording range when the image has a second image size different from the first image size.

19. An apparatus according to claim 9, wherein said calculation means calculates a variance of the density distribution or the density change distribution as the degree or dispersion, and said determination means determines the image size on the basis of that said predetermined area is in the image recording range when the calculated variance exceeds a predetermined value and that said predetermined area is outside the image recording range when the calculated variance does not exceed the predetermined value.

20. A method according to claim 11, wherein said calculating step includes a step of calculating a variance of the density distribution or the density change distribution as the degree of dispersion, and said determining step determines the image size on the basis of that said predetermined area is in the image recording range when the calculated variance exceeds a predetermined value and that said predetermined area is outside the image recording range when the calculated variance does not exceed the predetermined value.

* * * * *